(12) United States Patent
Ueki et al.

(10) Patent No.: US 9,857,041 B2
(45) Date of Patent: Jan. 2, 2018

(54) DAYLIGHTING DEVICE

(71) Applicant: Sharp Kabushiki Kaisha, Sakai, Osaka (JP)

(72) Inventors: Shun Ueki, Sakai (JP); Shumpei Nishinaka, Sakai (JP); Daisuke Shinozaki, Sakai (JP); Tsuyoshi Kamada, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/302,222

(22) PCT Filed: Apr. 3, 2015

(86) PCT No.: PCT/JP2015/060602
§ 371 (c)(1),
(2) Date: Oct. 6, 2016

(87) PCT Pub. No.: WO2015/156225
PCT Pub. Date: Oct. 15, 2015

(65) Prior Publication Data
US 2017/0023197 A1 Jan. 26, 2017

(30) Foreign Application Priority Data
Apr. 8, 2014 (JP) .................. 2014-079513

(51) Int. Cl.
*F21S 11/00* (2006.01)
*G02B 5/02* (2006.01)
(Continued)

(52) U.S. Cl.
CPC ............. *F21S 11/007* (2013.01); *F21V 3/049* (2013.01); *F21V 5/00* (2013.01); *F21V 7/0091* (2013.01);
(Continued)

(58) Field of Classification Search
CPC ...................................... F21S 11/007
(Continued)

(56) References Cited

U.S. PATENT DOCUMENTS 607,792 A * 7/1898 Winger .................... F21S 11/00
359/595
752,429 A * 2/1904 Wadsworth ............... F21V 5/02
359/594

(Continued)

FOREIGN PATENT DOCUMENTS

JP 2008-040021 A 2/2008
JP 2009-266794 A 11/2009
(Continued)

OTHER PUBLICATIONS

Official Communication issued in International Patent Application No. PCT/JP2015/060602, dated Jul. 7, 2015.

*Primary Examiner* — Christopher Mahoney
(74) *Attorney, Agent, or Firm* — Keating & Bennett, LLP

(57) ABSTRACT

Provided is a daylighting device (10) including a daylighting member (11) that has a base having light transparency, a plurality of daylighting portions that are provided on one surface of the base and have light transparency, and gap portions provided between the plurality of daylighting portions; and a light diffusion member (12) that is arranged on a light output surface side of the daylighting member (11) and diffuses light output from the daylighting member (11).

7 Claims, 19 Drawing Sheets

(51) Int. Cl.
 *G02B 19/00* (2006.01)
 *F21V 3/04* (2006.01)
 *F21V 5/00* (2015.01)
 *F21V 7/00* (2006.01)
 *H05B 33/08* (2006.01)
 *H05B 37/02* (2006.01)

(52) U.S. Cl.
 CPC ......... *G02B 5/0215* (2013.01); *G02B 5/0221* (2013.01); *G02B 5/0242* (2013.01); *G02B 5/0278* (2013.01); *G02B 19/0019* (2013.01); *G02B 19/0042* (2013.01); *H05B 33/0848* (2013.01); *H05B 37/0227* (2013.01)

(58) Field of Classification Search
 USPC .......................................... 359/595, 597–598
 See application file for complete search history.

(56) References Cited

U.S. PATENT DOCUMENTS

| | | | |
|---|---|---|---|
| 9,250,368 B2* | 2/2016 | Padiyath | G02B 5/045 |
| 2009/0009870 A1 | 1/2009 | Usami | |
| 2012/0019936 A1 | 1/2012 | Blessing et al. | |
| 2013/0033873 A1 | 2/2013 | Suzuki et al. | |
| 2013/0265642 A1* | 10/2013 | Vasylyev | G02B 19/0042 |
| | | | 359/595 |
| 2015/0226394 A1* | 8/2015 | Ueki | E06B 9/386 |
| | | | 359/595 |

FOREIGN PATENT DOCUMENTS

| | | |
|---|---|---|
| JP | 2012-518190 A | 8/2012 |
| WO | 2011/129069 A1 | 10/2011 |

* cited by examiner

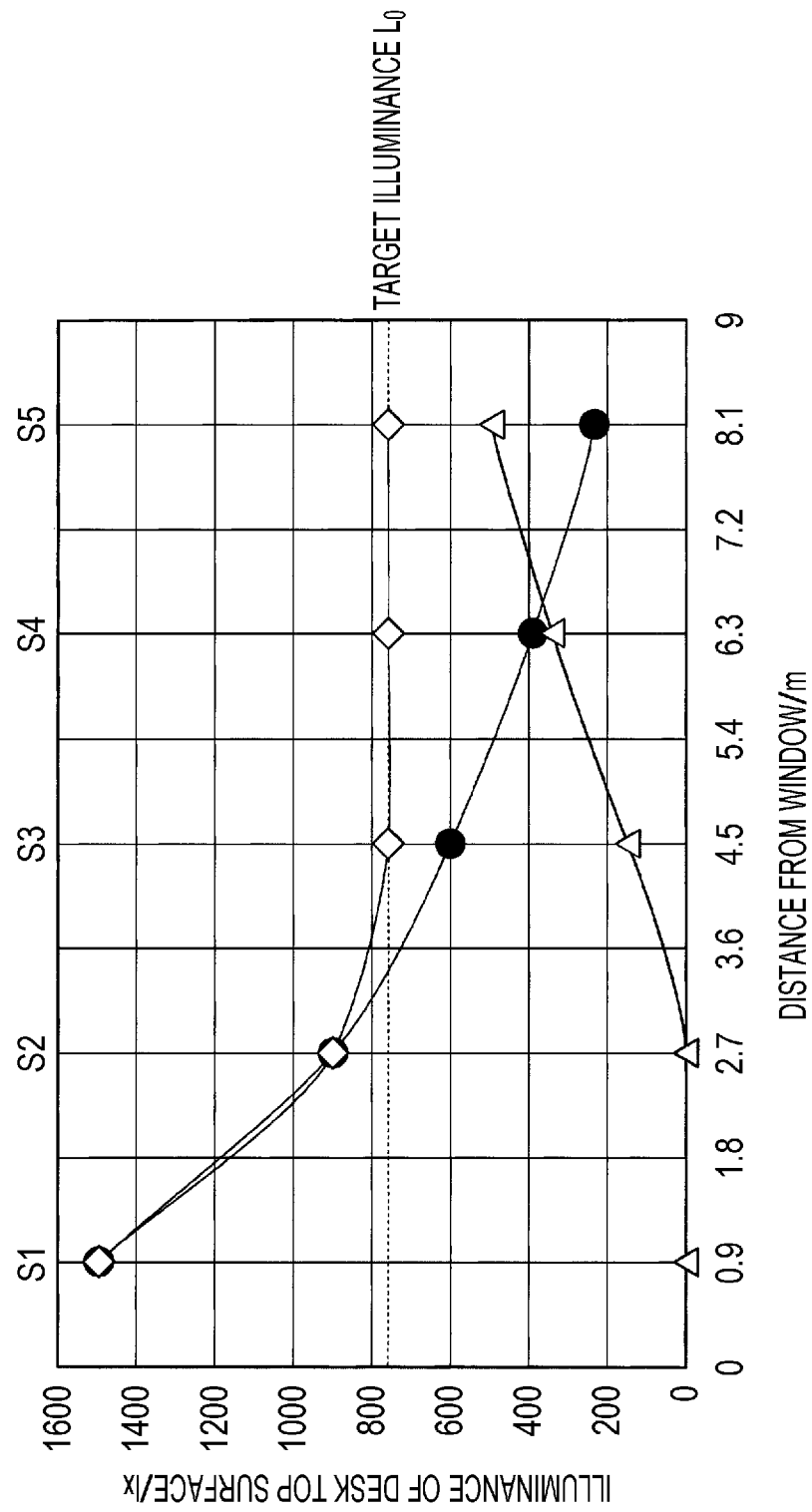

DAYLIGHTING DEVICE

TECHNICAL FIELD

The present invention relates to a daylighting device.

This application claims priority based on Japanese Patent Application No. 2014-079513 filed in Japan on Apr. 8, 2014, the content of which is incorporated herein.

BACKGROUND ART

A daylighting film for taking sunlight into a room through a window or the like of a building has been proposed (for example, refer to PTL 1). In the daylighting film, a plurality of unit prisms and plain areas are formed on one surface of a support which has light transparency. Sunlight is taken into a room through the unit prisms.

CITATION LIST

Patent Literature

PTL 1: Japanese Unexamined Patent Application Publication No. 2008-40021

SUMMARY OF INVENTION

Technical Problem

The daylighting film which includes the plurality of unit prisms is able to guide light deep inside a room, but, since directivity of sunlight to be taken into a room is high, a shade of a frame of a window is cast, or a shadow is cast in the room depending on a direction of the sun, in some cases. Such a phenomenon gives a person in the room an unpleasant impression on a light environment of the room. Moreover, the daylighting film is able to guide light deep inside the room, but it is difficult to diffuse light in a vicinity of a window, and therefore it is difficult to make the room bright over a wide area.

One aspect of the present invention aims to solve the aforementioned problems, and an object thereof is to provide a daylighting device capable of guiding light deep inside a room and diffusing light in a vicinity of a window.

Solution to Problem

In order to achieve the aforementioned object, one aspect of the invention adopts the following means.

(1) A daylighting device in one aspect of the invention includes: a daylighting member that has a base having light transparency, a plurality of daylighting portions that are provided on one surface of the base and have light transparency, and gap portions provided between the plurality of daylighting portions; and a light diffusion member that is arranged on a light output surface side of the daylighting member and diffuses light output from the daylighting member.

(2) It is preferable that, in the daylighting device according to (1) above, at least two types of light diffusion regions are provided on one surface side of the light diffusion member, and the at least two types of light diffusion regions have light diffusion characteristics different from each other.

(3) It is preferable that, in the daylighting device according to (2) above, the at least two types of light diffusion regions are arranged to be adjacent to each other.

(4) It is preferable that, in the daylighting device according to (2) or (3) above, a proportion occupied by at least one type of the light diffusion regions changes along one direction of the one surface of the light diffusion member.

(5) It is preferable that, in the daylighting device according to (1) above, light diffusion regions light diffusion characteristics of which continuously change are provided on one surface side of the light diffusion member.

(6) It is preferable that, in the daylighting device according to (1) above, the light diffusion regions have designability.

Advantageous Effects of Invention

According to one aspect of the invention, it is possible to provide a daylighting device capable of guiding light deep inside a room and diffusing light in a vicinity of a window.

BRIEF DESCRIPTION OF DRAWINGS

FIG. 20 is a graph indicating a relation between illuminance of light (natural light) taken into a room by the daylighting device and illuminance by an indoor lighting device (lighting control system).

DESCRIPTION OF EMBODIMENTS

Description will hereinafter be given in detail for embodiments of the invention with reference to drawings.

Note that, in all the drawings referenced below, the scale may be varied among components for clarity of the components.

First Embodiment

Hereinafter, a first embodiment of the invention will be described by referring to FIGS. 1 to 9.

A daylighting device of the first embodiment is used for taking sunlight into a room, for example, in a form of being pasted on a window.

Figure 1:
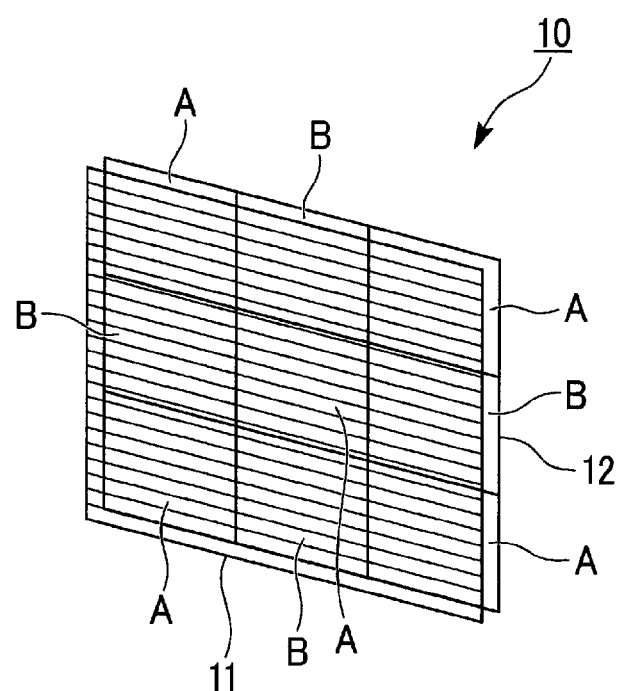
FIG. 1 is a schematic perspective view illustrating a daylighting device of a first embodiment.

FIG. 1 is a schematic perspective view illustrating the daylighting device of the present embodiment.

A daylighting device 10 of the present embodiment is schematically composed of a daylighting member 11 and a light diffusion member 12 which is arranged on a light output surface side of the daylighting member 11 and diffuses light output from the daylighting member 11.

Figure 2:
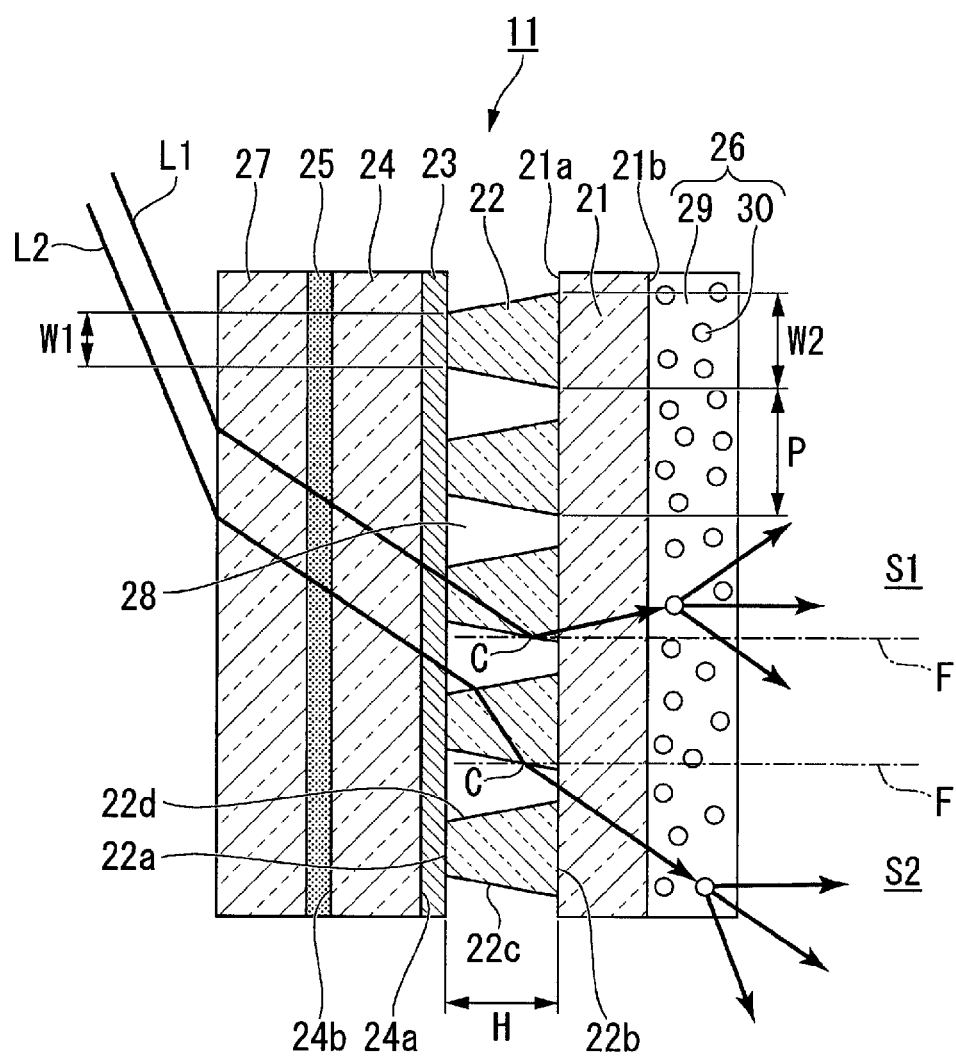
FIG. 2 is a schematic sectional view illustrating a first example of a daylighting member.

Examples of the daylighting member 11 include a member illustrated in FIG. 2. The daylighting member 11 of a first example includes a first base 21, a plurality of daylighting portions 22, a first adhesion layer 23, a second base 24, a second adhesion layer 25, and a light scattering layer 26. The plurality of daylighting portions 22 are provided on a first surface 21a of the first base 21. The second base 24 is arranged to face the first surface 21a of the first base 21 with the plurality of daylighting portions 22 held therebetween. A first surface 24a of the second base 24 and the plurality of daylighting portions 22 are adhered to each other with the first adhesion layer 23. The light scattering layer 26 is provided on a second surface 21b of the first base 21. The second adhesive layer 25 is provided on a second surface 24b of the second base 24 and functions to bond an entire of the daylighting member 11 to window glass 27. Spaces between the plurality of daylighting portions 22 are gap portions 28.

The first base 21 is, for example, a base having light transparency and formed of resins and the like such as a thermoplastic polymer, a thermosetting resin, or a photopolymerizable resin. A base having light transparency, which is composed of an acrylic polymer, an olefin polymer, a vinyl polymer, a cellulose polymer, an amide polymer, a fluorine polymer, a urethane polymer, a silicone polymer, an imide polymer, or the like, is used. Specifically, for example, a base having light transparency, such as a triacetylcellulose (TAC) film, a polyethylene terephthalate (PET) film, a cycloolefin polymer (COP) film, a polycarbonate (PC) film, a polyethylene naphthalate (PEN) film, a polyether sulfone (PES) film, or a polyimide (PI) film, is preferably used. In the present embodiment, a PET film having a thickness of 100 μm is, for example, used. A total light transmittance of the first base 21 is preferably equal to or greater than 90%, for example. Thereby, it is possible to obtain sufficient transparency.

The second base 24 is a base having light transparency, similarly to the first base 21. A material of the second base 24 and a material of the first base 21 may be the same or may be different.

Each of the daylighting portions 22 is formed of an organic material having light transparency and photosensitivity, such as an acrylic resin, an epoxy resin, or a silicone resin, for example. A mixture made of a transparent resin obtained by mixing, into such a resin, a polymerization initiator, a coupling agent, a monomer, an organic solvent, etc. is able to be used. Further, the polymerization initiator may contain various additional components, such as a stabilizer, an inhibitor, a plasticizer, a fluorescent brightener, a release agent, a chain transfer agent, and other photopolymerizable monomers. A total light transmittance of the daylighting portions 22 is preferably equal to or more than 90%. Thereby, it is possible to obtain sufficient transparency.

Each of the daylighting portions 22 is a member which linearly extends to be long and narrow in a direction (direction perpendicular to a paper surface of FIG. 2) and has a trapezoid sectional shape in a direction orthogonal to a longitudinal direction. The longitudinal direction of the daylighting portion 22 is parallel to one side of the first base 21 having a rectangular shape. The plurality of daylighting portions 22 are arranged to be parallel to each other and away from each other.

A surface corresponding to a short side of two mutually parallel sides of the trapezoid which forms the sectional shape of the daylighting portion 22 is a surface on a side facing the second base 24, and referred to as a first end surface 22a in description below. A surface corresponding to a long side of the trapezoid is a surface on a side in contact with the first base 21, and referred to as a second end surface 22b in the description below.

When it is set that a width of the first end surface 22a of each of the daylighting portions 22 is W1, a width of the second end surface 22b of the daylighting portion 22 is W2, a height of the daylighting portion 22 in a direction normal to the first base 21 is H, and a pitch of the daylighting portion 22 in an array direction is P, all of the daylighting portions 22 have the same width W1 of the first end surface 22a, width W2 of the second end surface 22b, height H, and pitch P. Moreover, a relation between the width W1 of the first end surface 22a and the width W2 of the second end surface 22b is W1<W2. The width W1 of the first end surface 22a and the width W2 of the second end surface 22b of the daylighting portion 22 are 10 μm to 50 μm, for example. The height H of the daylighting portion 22 is 10 μm to 100 μm, for example.

Note that, though an example in which the plurality of daylighting portions 22 are arranged away from each other is described here, end parts of the second end surfaces 22b of adjacent daylighting portions 22 may be in contact with each other.

In each of the gap portions 28, there is air. Accordingly, a reflective index of the gap portions 28 is approximately 1.0. By setting the reflective index of the gap portions 28 to be 1.0, a critical angle at an interface 22c between the gap portion 28 and the daylighting portion 22 becomes the smallest. In the case of the present embodiment, the gap portion 28 is set to be an air layer composed of air, but the gap portion 28 may be an inert gas layer composed of inert gas such as nitrogen, or may be a reduced pressure layer brought into a state where pressure is reduced.

The light scattering layer 26 has a configuration in which light scatterers 30 are dispersed in a resin 29 having light transparency. The resin 29 may be a mixture made of a transparent resin obtained by mixing a polymerization initiator, a coupling agent, a monomer, an organic solvent, etc. into a resin such as an acrylic resin, an epoxy resin, or a silicone resin, for example. The polymerization initiator may contain various additional components, such as a stabilizer, an inhibitor, a plasticizer, a fluorescent brightener, a release agent, a chain transfer agent, and other photopolymerizable monomers.

The light scatterers 30 have a function of scattering light incident on the light scattering layer 26. The light scatterers 30 are particles (small pieces) which have a reflective index different from that of the resin 29 constituting the light scattering layer 26. It is desirable that the light scatterers 30 are mixed into the light scattering layer 26 and dispersed without aggregation. The light scatterers 30 are made of, for example, a material having light transparency, which is composed of glasses, a resin such as an acrylic polymer, an olefin polymer, a vinyl polymer, a cellulose polymer, an amide polymer, a fluorine polymer, a urethane polymer, a silicone polymer, an imide polymer, or the like. Alternatively, the light scatterers 30 may be air bubbles dispersed in the resin 29. The shape of each of the light scatterers 30 may be a globular shape, an ellipse globular shape, a flat plate shape, a polyhedron, or the like, for example.

The size of the light scatterers 30 only needs to be, for example, about 0.5 μm to 20 μm, and may be uniform or may be different.

The light scattering layer 26 is not necessarily limited to have a configuration in which the light scatterers 30 are dispersed, and may be configured by a layer on a surface of which unevenness is formed. In this case, the unevenness may be formed directly on the second surface 21b of the first base 21.

The first adhesion layer 23 sticks the first surface 24a of the second base 24 and the first end surfaces 22a of the plurality of daylighting portions 22 together. The first adhesion layer 23 is a general optical adhesive. It is desirable that a reflective index of the first adhesion layer 23 is equal to a reflective index of the second base 24 or a reflective index of the daylighting portions 22. In a case where the reflective index of the first adhesion layer 23 is equal to the reflective index of the second base 24 or the reflective index of the daylighting portions 22, refraction is not to be caused at an interface between the first adhesion layer 23 and the second base 24 or an interface between the first adhesion layer 23 and the daylighting portions 22.

The second adhesion layer 25 sticks the second surface 24b of the second base 24 and the window glass 27 together. The second adhesion layer 25 may be provided or may not be provided on the second surface 24b of the second base 24 at first as a component of the daylighting member 11. In the case of not being provided, the second adhesion layer 25 may be supplied to the second surface 24b of the second base 24 when performing work of pasting the daylighting member 11 on the window glass 27. The second adhesion layer 25 is a general optical adhesive. It is desirable that a reflective index of the second adhesion layer 25 is equal to the reflective index of the second base 24 or a reflective index of the window glass 27. In a case where the reflective index of the second adhesion layer 25 is equal to the reflective index of the second base 24 or the reflective index of the window glass 27, refraction is not to be caused at an interface between the second adhesion layer 25 and the second base 24 or an interface between the second adhesion layer 26 and the window glass 27.

The daylighting member 11 is pasted on the window glass 27 so that the longitudinal direction of the daylighting portions 22 is in a horizontal direction and the array direction of the plurality of daylighting portions 22 is in a vertical direction. Light directly delivered from the sun is incident obliquely downward on the daylighting member 11 installed on the window glass 27. The light incident on the daylighting member 11 passes through the window glass 27, the second adhesion layer 25, the second base 24, and the first adhesion layer 23, and reaches the daylighting portion 22.

For convenience of description, it is set here that a point at which one certain light flux of the light incident on the daylighting portion 22 is incident on a lower side surface 22c (reflection surface) of the daylighting portion 22 is a point C. A virtual straight line which passes through the point C and is orthogonal to the first surface 21a of the first base 21 is a straight line F. One of the two spaces whose boundary is a horizontal plane including the straight line F is a first space S1 in which the light incident on the point C exists, and the other space is a second space S2 in which the light incident on the point C does not exist.

Light L1 incident from the first end surface 22a of the daylighting portion 22 is totally reflected by, for example, the lower side surface 22c of the daylighting portion 22, travels obliquely upward, that is, toward the side of the first space S1, and is output from the daylighting portion 22.

The light L1 output from the daylighting portion 22 passes through the first base 21, is scattered by the light scatterers 30 of the light scattering layer 26, and output from the daylighting member 11. On the other hand, for example, light L2 which passes through the first adhesion layer 23 and the gap portion 28 and is made incident from an upper side surface 22d of the daylighting portion 22, when being made incident on the lower side surface 22c of the daylighting portion 22 at an angle less than the critical angle, is not reflected by the lower side surface 22c of the daylighting portion 22, travels obliquely downward, that is, toward the side of the second space S2, and is output from the daylighting portion 22. The light L2 output from the daylighting portion 22 is scattered by the light scatterers 30 of the light scattering layer 26, and output from the daylighting member 11.

Though colorless transparent members are used for the first base 21, the second base 24, and the daylighting portions 22 in the present embodiment, colors of the first base 21, the second base 24, and the daylighting portions 22 are not limited thereto. For example, in order to adjust color temperature of light to be taken into a building, the first base 21, the second base 24, and the daylighting portions 22 may be colored light yellow, orange, blue, or the like. By taking design qualities and the like into consideration, a part or all of the first base 21, the second base 24, and the daylighting portions 22 may be colored red, blue, or the like. Thereby, it is possible to provide a window like stained glass.

Though the daylighting portions 22 are formed as a member in a stripe shape with a constant width in the present embodiment, the shape of the daylighting portions 22 is not limited thereto. As long as each of the plurality of daylighting portions 22 has the longitudinal direction in substantially the same direction and the longitudinal direction is arranged in a direction parallel to one side of the first base 21 having a rectangular shape, it is possible to obtain an effect similar to that of the present embodiment. Here, "each of the plurality of daylighting portions has the longitudinal direction in substantially the same direction" means the following, for example. That is, light such as fluorescence, which is isotropically scattered, is caused to enter the first base 21 from a side of the first base 21, which is opposite to a side on which the daylighting portions 22 are formed, and polar angle luminance distribution of light output to an outside of the plurality of daylighting portions 22 is measured. At this time, in a case where there are a direction in which luminance of the light output from the plurality of the daylighting portions 22 is relatively strong and a direction relatively weak means that "the daylighting portions have the longitudinal direction in substantially the same direction". A direction orthogonal to the direction in which the luminance is relatively strong is defined as "the same direction" described above.

In the present embodiment, an interval between the daylighting portions 22 is constant, but the interval of the daylighting portions 22 is not necessarily constant. The plurality of daylighting portions 22 may be arranged to be adjacent to each other at irregular intervals.

Thereby, it is possible to suppress generation of interference fringes caused in a case where the daylighting portions 22 are regularly formed. In addition, it is not always necessary to arrange the plurality of daylighting portions 22 with intervals, and the daylighting portions 22 may be in contact with each other.

The daylighting member 11 of the first example is able to isotropically scatter light output from the first base 21 in all directions.

Figure 3:
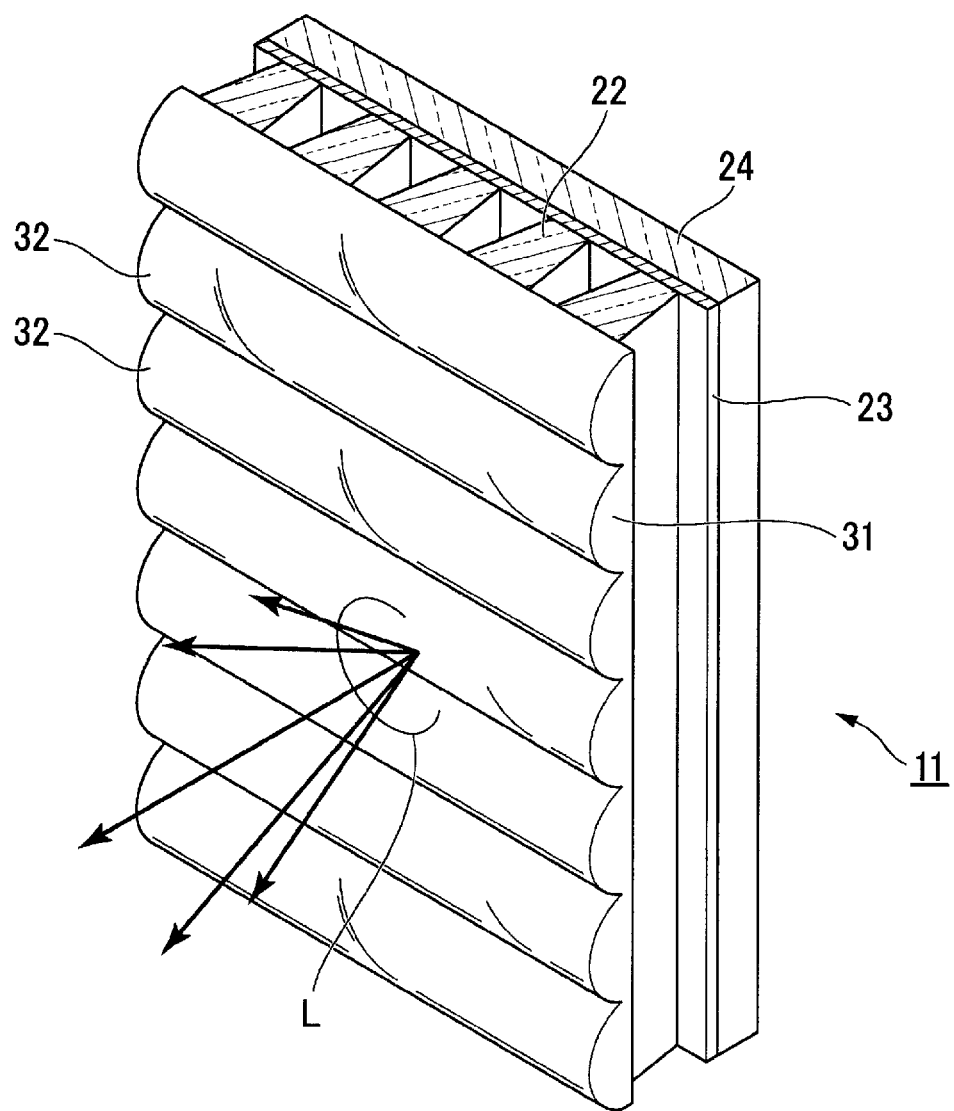
FIG. 3 is a schematic perspective view illustrating a second example of the daylighting member.

An example of the daylighting member 11 includes a member illustrated in FIG. 3. In the daylighting member 11 of a second example, a plurality of convex lenses 32 each of which extends in a vertical direction and which are parallel to each other are provided on a second surface of a first base 31. In other words, lenticular lenses are provided on the second surface of the first base 31. The convex lenses 32 may be integrated with the first base 31 by processing the second surface 32 itself of the first base 31, or may be formed separately from the first base 31. The daylighting member 11 of the second example does not include the light scattering layer 26 in the daylighting member 11 of the first example.

The other components are similar to those of the first example.

A lens surface of each of the convex lenses 32 has a curvature in a horizontal plane, and does not have a curvature in the vertical direction. Accordingly, the convex lens 32 has a high light scattering property in a horizontal direction, and does not have the light scattering property in the vertical direction. Thus, when being output from the convex lens 32, light L which is incident on the first base 31 from the daylighting portion 22 is greatly scattered in the horizontal direction, and output without being scattered in the vertical direction, while maintaining angle distribution when being output from the daylighting portion 22.

Note that, though the plurality of convex lenses 32 are provided on the second surface of the first base 31 in the daylighting member 11 of the second example, instead of this configuration, an anisotropic scattering structure may be provided on the second surface of the first base 31. For the anisotropic scattering structure, one in which an uneven structure of μm level is formed by a surface relief hologram pattern, for example, such as a light diffusion control film (product name: LSD) manufactured by Luminit, LLC, may be used. Alternatively, instead of one having an uneven shape on the second surface of the first base 31, a light scattering layer obtained by dispersing particles whose aspect ratio is about 5 to 500 in a continuous layer may be used.

The daylighting member 11 of the second example is able to anisotropic ally scatter light output from the first base 31. Particularly, the daylighting member 11 of the second example is able to strongly scatter the light output from the first base 31 in the horizontal direction.

In the light diffusion member 12, at least two types of light diffusion regions are provided on a side of a surface in a side opposite to a surface facing the daylighting member 11 (one surface), and the at least two types of light diffusion regions have light diffusion characteristics different from each other. Moreover, the at least two types of light diffusion regions are arranged to be adjacent to each other.

In the present embodiment, as illustrated in FIG. 1, for example, the light diffusion member 12 has two types of light diffusion regions A and B which have light diffusion characteristics different from each other, and the light diffusion regions A and B are arranged to be adjacent to each other. The light diffusion regions A and B are formed to have predetermined shapes and sizes (areas).

In this case, the light diffusion regions A and B having light diffusion characteristics different from each other means that light scattering in the light diffusion regions A is weak and light scattering in the light diffusion regions B is strong.

The light diffusion regions A send light, whose direction has been changed in the daylighting member 11, approximately in the changed direction. Accordingly, the deep inside of a room is able to be illuminated with a ray of light output from the light diffusion regions A.

Figure 4:
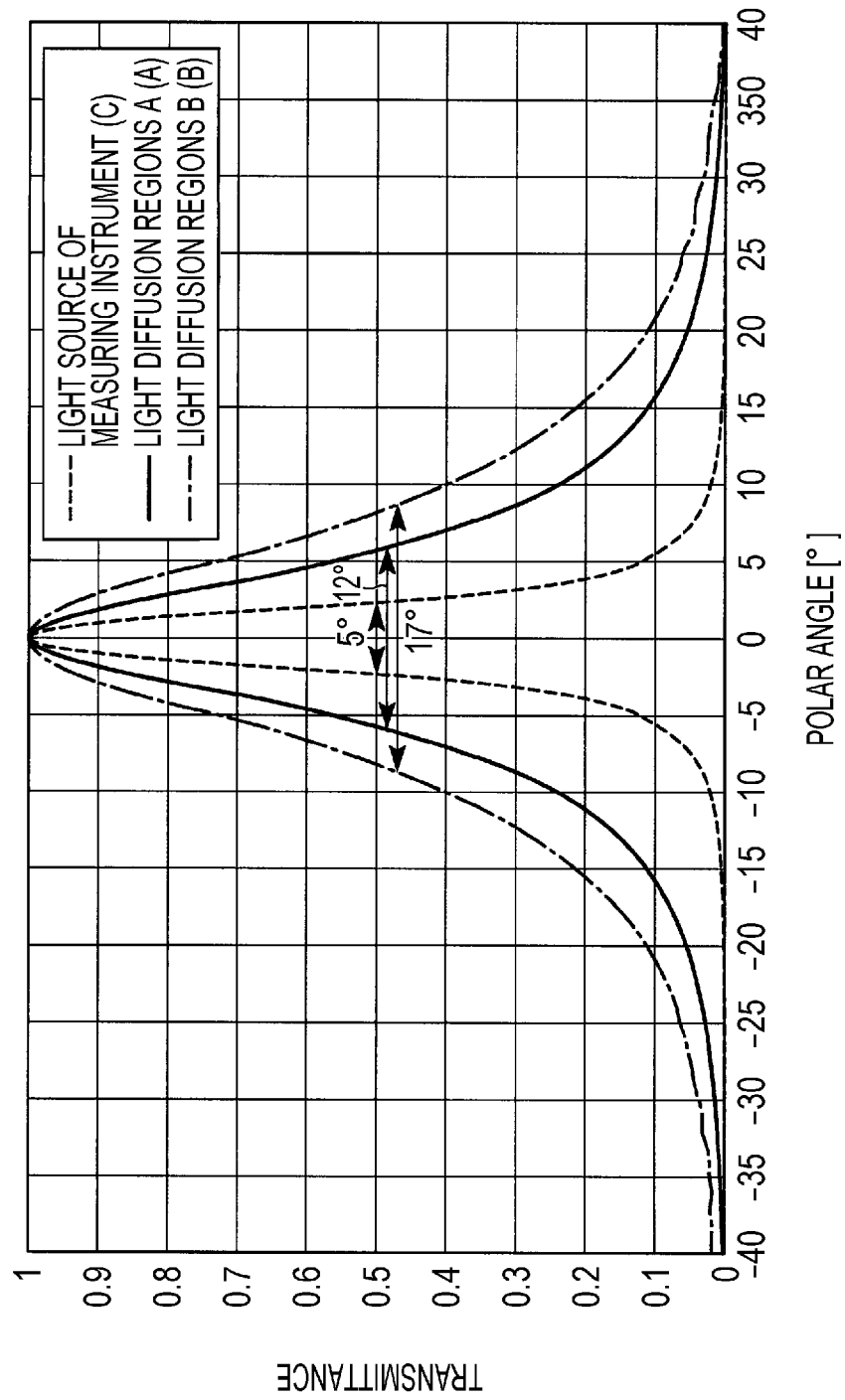
FIG. 4 is a graph indicating angle profiles of diffusion characteristics of two types of light diffusion regions whose light diffusion characteristics are different from each other.

In the light diffusion regions A, a haze value is 90, a total light transmittance (Tt) is 90%, and an angle profile of the diffusion characteristics is as indicated in FIG. 4, for example.

The light diffusion regions B diffuse light, whose direction has been changed in the daylighting member 11, in an up-and-down direction of the light diffusion member 12. Thereby, it is possible to increase components of light scattered in a sectional direction of the light diffusion member 12, and a wide range from a vicinity of a window of a room to deep inside the room is illuminated with the light. Moreover, by scattering light in the sectional direction of the light diffusion member 12, it is possible to illuminate the room toward the center thereof with the light regardless of a direction of the sun. In the light diffusion regions B, a haze value is 70, a total light transmittance (Tt) is 70%, and an angle profile of the diffusion characteristics is as indicated in FIG. 4, for example.

A difference of scattering degrees of applied light between the light diffusion regions A and B is controlled by diffusion patterns provided in the side of the one surface of the light diffusion member 12. In the light diffusion member 12, unevenness which scatters light is provided. It is possible to dispose the diffusion patterns, in each of which strength of scattering light is adjusted by a size, density of arrangement, a shape, etc. of the unevenness, on the one surface of the light diffusion member 12.

It is preferable that the diffusion patterns (light diffusion regions A and B) provided in the light diffusion member 12 are patterned to have sizes and arrangement by which light taken with the respective patterns is sufficiently mixed in a room. That is, it is preferable that each of the diffusion patterns (light diffusion regions A and B) is formed on the one surface of the light diffusion member 12 so as to have a size from several mm to several tens cm. In a case where the size is larger than this, taken light is not sufficiently mixed, and an effect obtained by mixing the light diffusion regions A and B is to be lost.

On the one surface of the light diffusion member 12, uneven patterns (diffusion patterns), for example, as illustrated in FIG. 5A to FIG. 8B are formed correspondingly to the light diffusion regions A and B. The uneven patterns are formed to have a pitch of several μm to several tens μm by which visible light is scattered, and are irregularly provided to an extent that light is not diffracted.

Figure 5A:
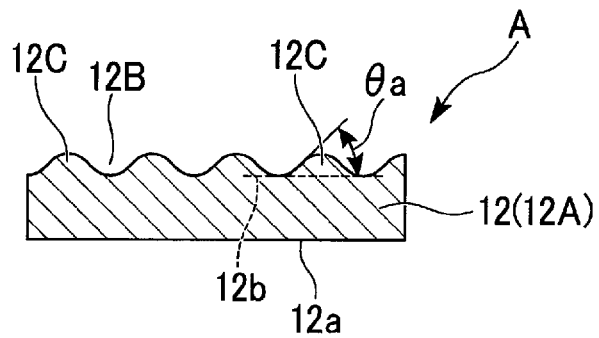
FIG. 5A is a first schematic sectional view illustrating a first example of a diffusion pattern provided in the two types of light diffusion regions whose light diffusion characteristics are different from each other.
Figure 5B:
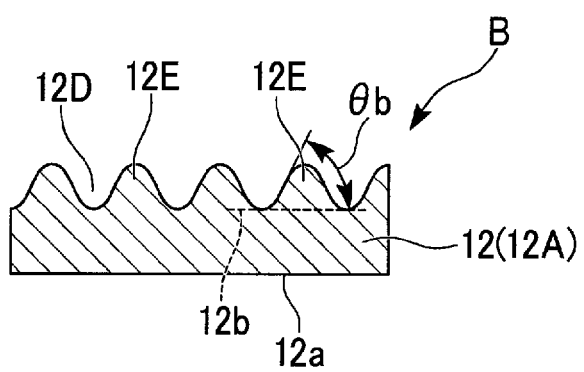
FIG. 5B is a second schematic sectional view illustrating the first example of the diffusion pattern provided in the two types of light diffusion regions whose light diffusion characteristics are different from each other.

FIG. 5A and FIG. 5B are schematic sectional views illustrating a first example of the diffusion patterns provided in the light diffusion regions A and B.

In the light diffusion regions A, concaves 12B and convexes 12C are continuously formed on one surface side of a base 12A having light transparency, which constitutes the light diffusion member 12. As illustrated in FIG. 5A and FIG. 5B, for example, an angle formed by each of the convexes 12C and a surface 12b parallel to a bottom surface 12a of the base 12A is $\theta_a$ on average.

On the other hand, in the light diffusion regions B, concaves 12D and convexes 12E are continuously formed on the one surface side of the base 12A having light transparency, which constitutes the light diffusion member 12. As illustrated in FIG. 5A and FIG. 5B, for example, an angle formed by each of the convexes 12E and the surface 12b parallel to the bottom surface 12a of the base 12A is $\theta_b$ on average.

The light diffusion regions A and the light diffusion regions B are formed so that the angle $\theta_b$ in the light diffusion regions B is greater than the angle $\theta_a$ in the light diffusion regions A ($\theta_b > \theta_a$). Compared with the light diffusion regions A, in the light diffusion regions B, light is bent more greatly and light is diffused more strongly.

In addition, FIG. 4 illustrates a result of measurement of the diffusion characteristics as to the diffusion patterns of the first example.

In FIG. 4, the diffusion characteristics of the light diffusion regions A indicate diffusion characteristics having a half value width of 12° as indicated with a curved line (A). On the other hand, the diffusion characteristics of the light diffusion regions B indicate diffusion characteristics having a half value width of 17° as indicated with a curved line (B).

Note that, in FIG. 4, a curved line (C) indicates diffusion characteristics of a light source of a measuring instrument. The curved line (C) indicates diffusion characteristics having a half value width of 5°.

Figure 6A:
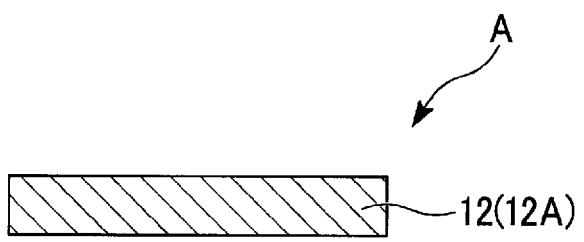
FIG. 6A is a first schematic sectional view illustrating a second example of the diffusion pattern provided in the two types of light diffusion regions whose light diffusion characteristics are different from each other.
Figure 6B:
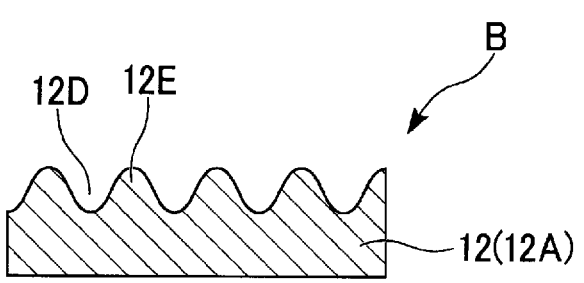
FIG. 6B is a second schematic sectional view illustrating the second example of the diffusion pattern provided in the two types of light diffusion regions whose light diffusion characteristics are different from each other.

FIG. 6A and FIG. 6B are schematic sectional views illustrating a second example of the diffusion patterns provided in the light diffusion regions A and B.

In the second example, neither the concave 12B nor the convex 12C as in the first example is formed in the light diffusion regions A. On the other hand, in the light diffusion regions B, the concaves 12D and the convexes 12E are continuously formed on the one surface side of the base 12A having light transparency, which constitutes the light diffusion member 12.

In the second example, compared with the light diffusion regions A, in the light diffusion regions B, light is bent more greatly and light is diffused more strongly.

Figure 7A:
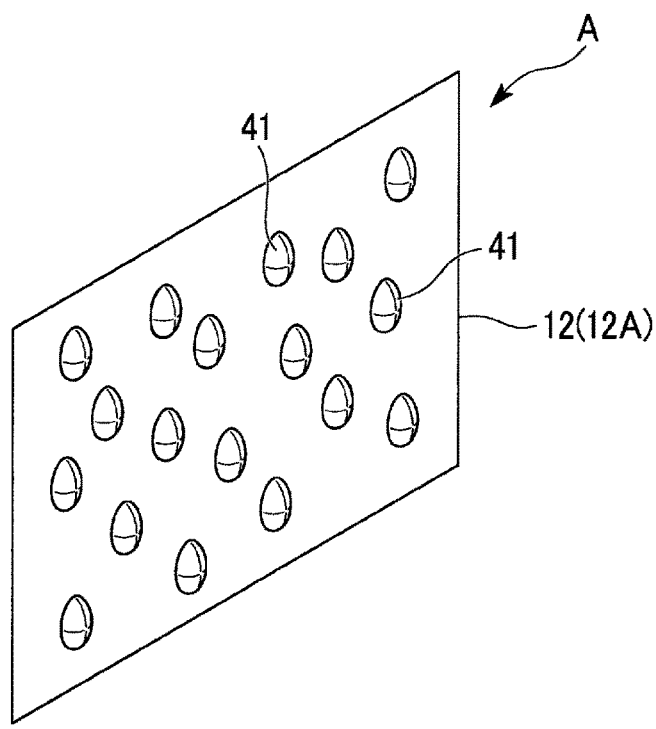
FIG. 7A is a first schematic perspective view illustrating a third example of the diffusion pattern provided in the two types of light diffusion regions whose light diffusion characteristics are different from each other.
Figure 7B:
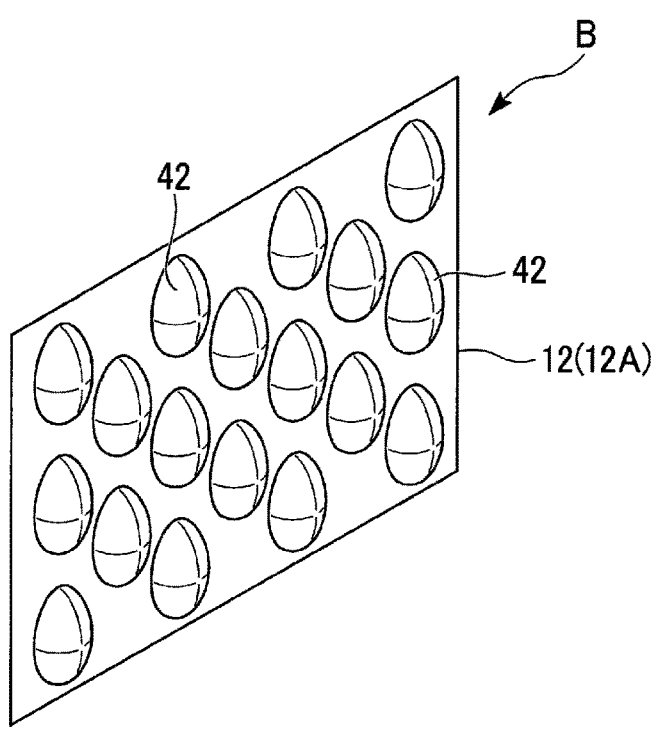
FIG. 7B is a second schematic perspective view illustrating the third example of the diffusion pattern provided in the two types of light diffusion regions whose light diffusion characteristics are different from each other.

FIG. 7A and FIG. 7B are schematic perspective views illustrating a third example of the diffusion patterns provided in the light diffusion regions A and B.

In the light diffusion regions A, a large number of light diffusion portions 41 each of which has an elliptical shape are formed on the one surface side of the base 12A of the light diffusion member 12. Each of the light diffusion portions 41 is disposed so that a major axis thereof is parallel to the up-and-down direction of the light diffusion member 12.

On the other hand, in the light diffusion regions B, a large number of light diffusion portions 42 each of which has an elliptical shape are formed on the one surface side of the base 12A of the light diffusion member 12. Each of the light diffusion portions 42 is disposed so that a major axis thereof is parallel to the up-and-down direction of the light diffusion member 12.

In this manner, by disposing the elliptical light diffusion portions 41 and 42 with directivity, it is possible to realize anisotropic diffusion that light is strongly diffused in a specific direction, and weakly diffused in the other directions.

In the third example, when the light diffusion portions 41 and the light diffusion portions 42 are arranged respectively in the light diffusion regions A and the light diffusion regions B at different density, it is possible to change strength of diffusing light in the respective light diffusion regions. In the third example, the density of arranging the light diffusion portions 42 in the light diffusion regions B is set to be higher than the density of arranging the light diffusion portions 41 in the light diffusion regions A, and thereby light is bent more greatly and light is diffused more strongly in the light diffusion regions B compared with the light diffusion regions A.

Further, in the third example, by changing a size or an elliptical ratio (ratio of the major axis and a minor axis) between the light diffusion portions 41 and the light diffusion portions 42, it is possible to change strength of diffusing light in the respective light diffusion regions. In the third example, for example, the size of each of the light diffusion portions 42 is set to be larger than the size of each of the light diffusion portions 41, and thereby light is bent more greatly and light is diffused more strongly in the light diffusion regions B compared with the light diffusion regions A.

Figure 8A:
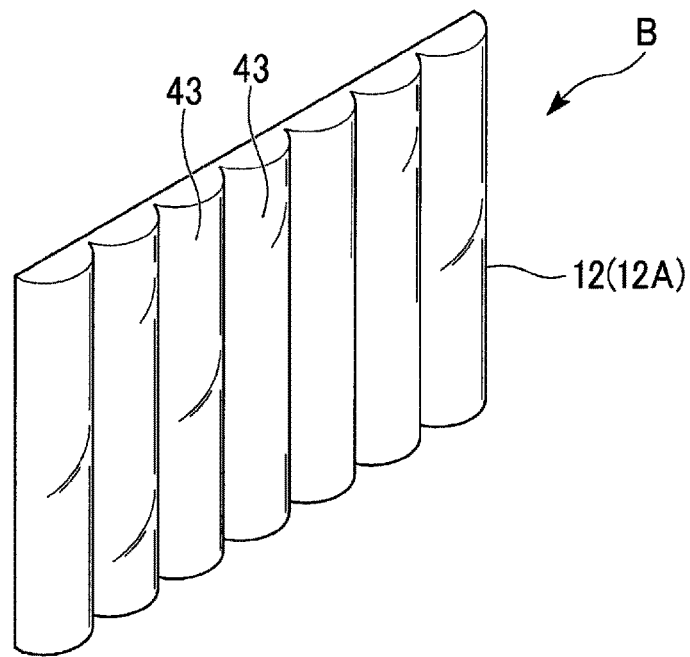
FIG. 8A is a first schematic perspective view illustrating a fourth example of the diffusion pattern provided in the two types of light diffusion regions whose light diffusion characteristics are different from each other.
Figure 8B:
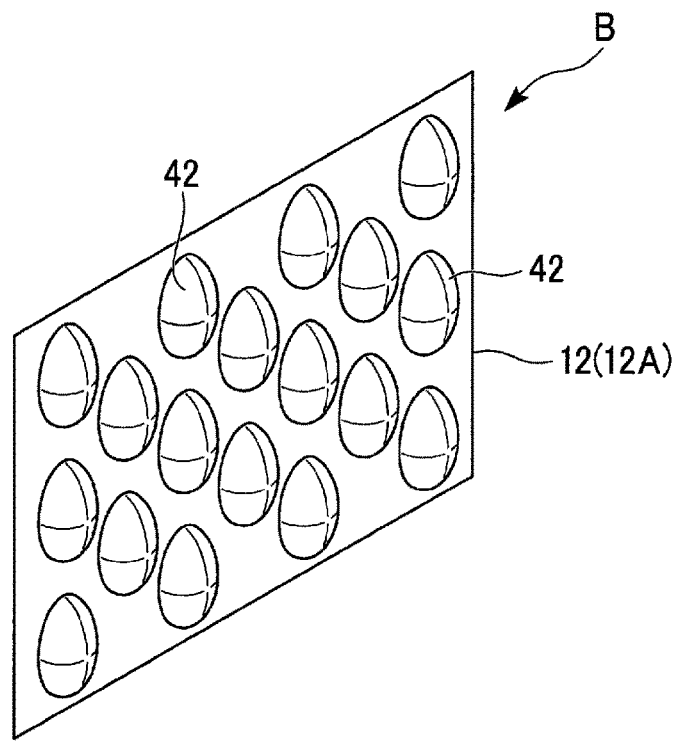
FIG. 8B is a second schematic perspective view illustrating the fourth example of the diffusion pattern provided in the two types of light diffusion regions whose light diffusion characteristics are different from each other.

FIG. 8A and FIG. 8B are schematic perspective views illustrating a fourth example of the diffusion patterns provided in the light diffusion regions A and B.

In the light diffusion regions A, a plurality of convex lenses 43 each of which extends in a vertical direction and which are parallel to each other are provided on the one surface side of the base 12A of the light diffusion member 12. In other words, lenticular lenses are provided on the one surface side of the base 12A of the light diffusion member 12. The convex lenses 43 may be integrated with the base 12A by processing the base 12A itself of the light diffusion member 12, or may be formed separately from the base 12A.

On the other hand, in the light diffusion regions B, a large number of light diffusion portions 42 each of which has an elliptical shape are formed on the one surface side of the base 12A of the light diffusion member 12. Each of the light diffusion portions 42 is disposed so that the major axis thereof is parallel to the up-and-down direction of the light diffusion member 12.

In the fourth example, by changing a shape or a size of the convex lenses 43 in the light diffusion regions A, or the density of arranging the light diffusion portions 42 or the size or the elliptical ratio (ratio of the major axis and the minor axis) of the light diffusion portions 42 in the light diffusion regions B, it is possible to change strength of diffusing light in the respective light diffusion regions.

The light diffusion member 12 is configured by providing the light diffusion regions A and B as above on the base 12A having light transparency. For the base 12A having light transparency, which constitutes the light diffusion member 12, for example, a base having light transparency, which is formed of resins and the like such as a thermoplastic polymer, a thermosetting resin, or a photopolymerizable resin, is used. A base having light transparency, which is composed of an acrylic polymer, an olefin polymer, a vinyl polymer, a cellulose polymer, an amide polymer, a fluorine polymer, a urethane polymer, a silicone polymer, an imide polymer, or the like, is used. Specifically, for example, a base having light transparency, such as a triacetylcellulose (TAC) film, a polyethylene terephthalate (PET) film, a cycloolefin polymer (COP) film, a polycarbonate (PC) film, a polyethylene naphthalate (PEN) film, a polyether sulfone (PES) film, or a polyimide (PI) film, is preferably used.

In the present embodiment, a PET film having a thickness of 100 μm is used as an example. A total light transmittance of the light diffusion member 12 is preferably equal to or greater than 90%, for example. Thereby, it is possible to obtain sufficient transparency.

The light diffusion patterns (uneven shape) as above is able to be formed on the one surface side of the base 12A of the light diffusion member 12 by forming the patterns by photolithography and thereafter applying heat sag processing as necessary. Thus, it is possible to easily perform patterning for each of the light diffusion regions A and B, and perform formation in a large area by succeeding patterns by step and repeat.

Note that, in each of the aforementioned first to fourth examples of the diffusion patterns, a case where the two types of light diffusion regions A and B which have light diffusion characteristics different from each other are provided in the light diffusion member 12 is exemplified, but the embodiments of the invention are not limited thereto. In the embodiments of the invention, three or more types of light diffusion regions which have light diffusion characteristics different from each other may be provided in the light diffusion member.

Figure 9A:
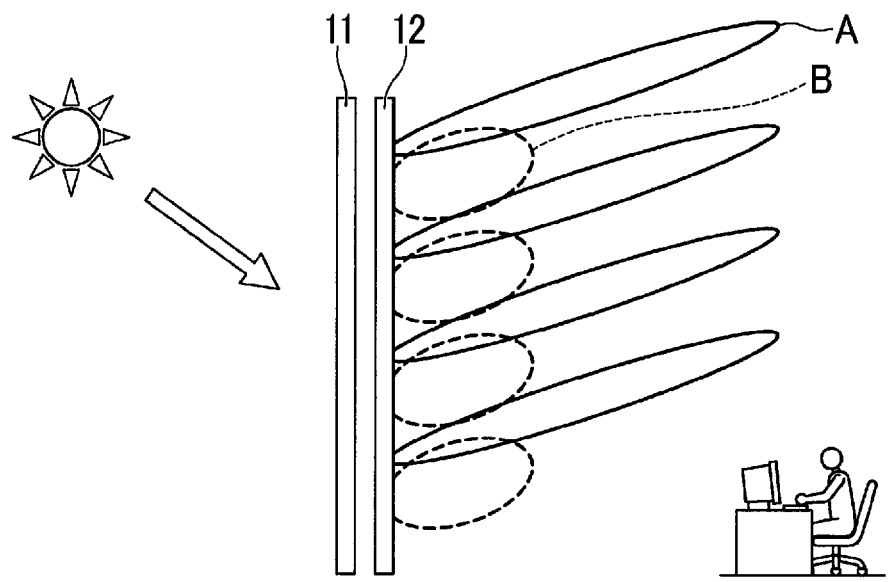
FIG. 9A is a schematic sectional view illustrating an example of a state where a room is illuminated with light by using the daylighting device of the first embodiment.
Figure 9B:
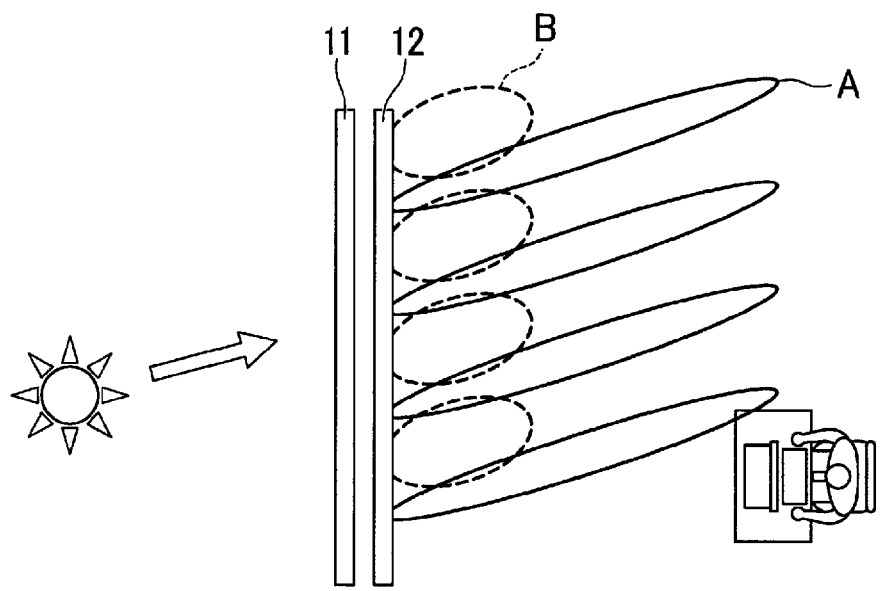
FIG. 9B is a schematic plan view illustrating the example of the state where the room is illuminated with light by using the daylighting device of the first embodiment.

In the daylighting device 10 of the present embodiment, the two types of light diffusion regions A and B which have light diffusion characteristics different from each other are two-dimensionally arranged on the one surface side of the light diffusion member 12, and the patterns of the light diffusion regions A in which light is scattered weakly and the light diffusion regions B in which light is scattered strongly are formed. In the present embodiment, in a case where the light diffusion regions A and B of the diffusion patterns of any of the aforementioned first to third examples are used, the respective diffusion patterns scatter light while expanding as schematically illustrated in FIG. 9A and FIG. 9B. Thereby, as illustrated in FIG. 9A, in an up-and-down direction (vertical direction) of a room, a deep inside the room is mainly illuminated with light scattered by the light diffusion regions A of weak scattering, and a vicinity of a window is mainly illuminated with light scattered by the light diffusion regions B of strong scattering, so that it is possible to uniformly illuminate a large area from the vicinity of the window to deep inside the room.

Moreover, as illustrated in FIG. 9B, in a right-and-left direction (horizontal direction) of the room, the deep inside the room is mainly illuminated with light scattered by the light diffusion regions A of weak scattering, and the vicinity of the window is mainly illuminated with light scattered by the light diffusion regions B of strong scattering, so that it is possible to uniformly illuminate the large area from the vicinity of the window to deep inside the room.

Figure 10A:
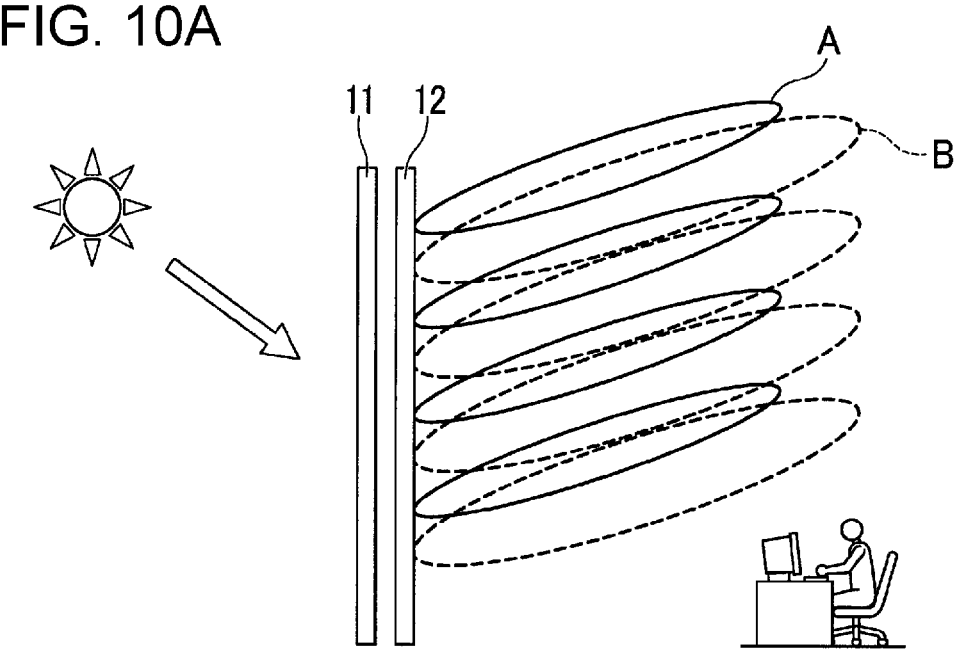
FIG. 10A is a schematic sectional view illustrating a different example of the state where the room is illuminated with light by using the daylighting device of the first embodiment.
Figure 10B:
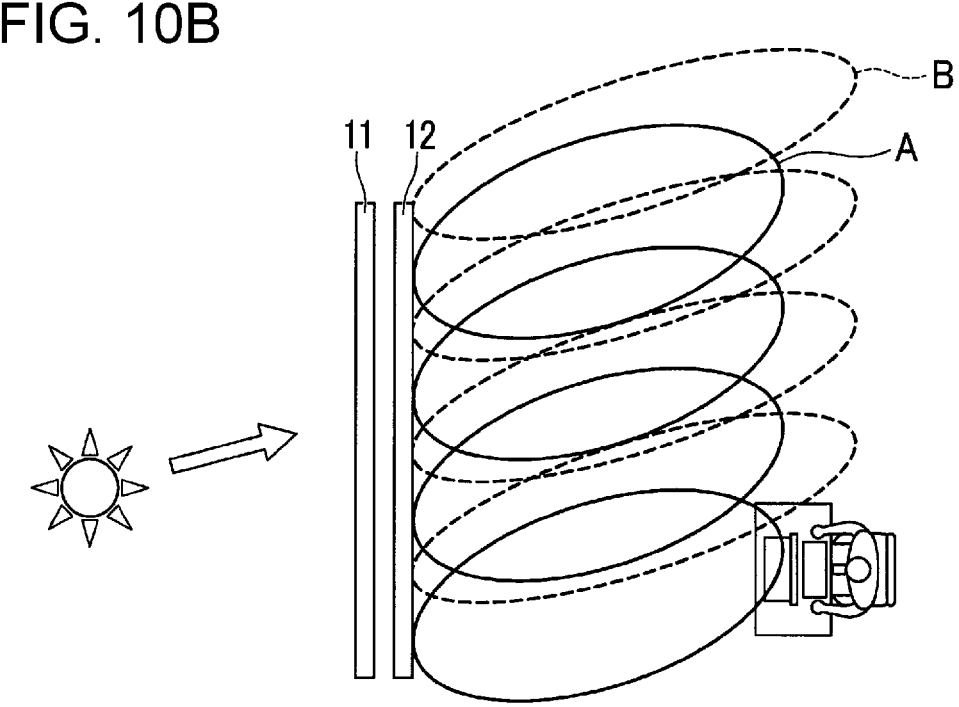
FIG. 10B is a schematic plan view illustrating the different example of the state where the room is illuminated with light by using the daylighting device of the first embodiment.

In the daylighting device 10 of the present embodiment, the two types of light diffusion regions A and B which have light diffusion characteristics different from each other are two-dimensionally arranged on the one surface side of the light diffusion member 12, and the patterns of the light diffusion regions A in which light is scattered strongly in the horizontal direction and the light diffusion regions B in which light is scattered uniformly in the vertical and horizontal directions compared with the light diffusion regions A are formed. In a case where the diffusion patterns A and B of the fourth example (FIG. 8A and FIG. 8B) are used for an embodiment, by the respective patterns, light is to be scattered with expansion as schematically illustrated in FIG. 10A and FIG. 10B. Thereby, as illustrated in FIG. 10A, in the up-and-down direction (vertical direction) of the room, light is not expanded in the room and guided deep inside the room by the light diffusion regions A having a vertical stripe pattern. On the other hand, by the light diffusion regions B each of which is in a vertically long elliptical shape, light is guided into the room with some expansion in the up-and-down direction, so that the vicinity of the window is also illuminated. Thus, it is possible to uniformly illuminate the large area from the vicinity of the window to deep inside the room.

Further, as illustrated in FIG. 10B, in the right-and-left direction (horizontal direction) of the room, the light diffusion regions A guide light into the room with great expansion in the horizontal direction, so that it is possible to uniformly illuminate the room during the day without being affected by a direction of the sun. The light diffusion regions B guide light into the room with some expansion, which is not as large as that of the light diffusion regions A, and therefore function to illuminate a part different from that of the light diffusion regions A.

That is, a scattering profile of the light diffusion regions A expands to be a large disk shape only in the horizontal direction. On the other hand, the light diffusion regions B have a smaller disk ratio and expand light in a shape like a rugby ball. Though not able to be described unconditionally because which of the light diffusion regions A and the light diffusion regions B diffuse light farther depends on parameters of the light diffusion regions A and B, the light diffusion regions B guide light farther in FIG. 10A and FIG. 10B. The smaller a solid angle of an elliptical body (disk) in which light diffusion expands is, the farther light is able to be guided.

In this manner, by using the plurality of light diffusion regions each of which has different diffusion characteristics in the surface, it is possible to illuminate the large area in the room, which is from the vicinity of the window to deep inside the room. Note that, in the right-and-left direction (horizontal direction) of the room, though the deep inside the room is illuminated with light scattered by the light diffusion regions B, due to high linearity, the illumination is greatly affected by the direction of the sun. Then, by appropriately mixing the light diffusion regions A and the light diffusion regions B in the light diffusion member 12, it is possible to brightly illuminate also deep inside the room with small unevenness of illuminance.

Figure 11:
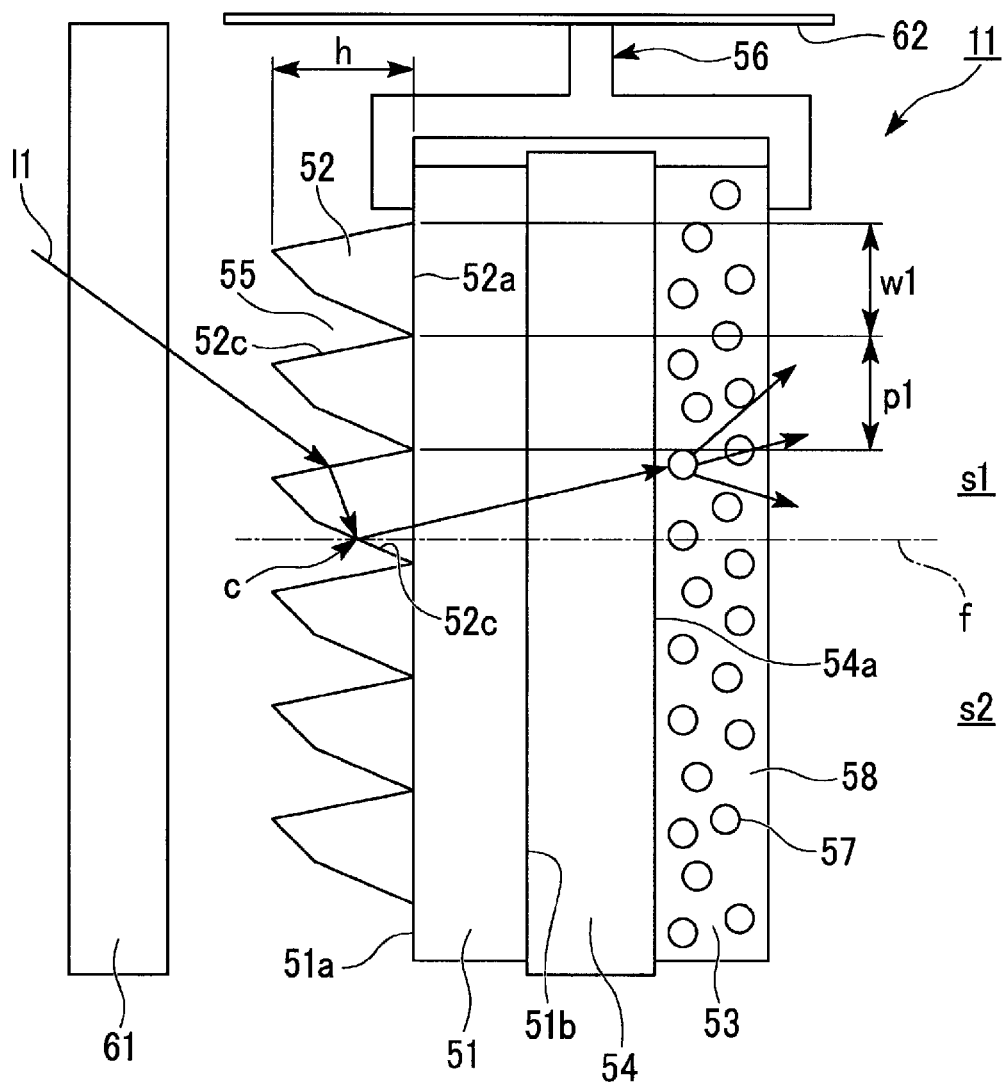
FIG. 11 is a schematic perspective view illustrating a third example of the daylighting member.

Moreover, an example of the daylighting member 11 includes a member illustrated in FIG. 11. The daylighting member 11 of a third example includes a base 51, a plurality of daylighting portions 52, and a light scattering layer 53. The plurality of daylighting portions 52 are provided on a first surface 51a of the base 51. Moreover, a glass bass (support plate) 54 is arranged on a second surface 51b of the base 51, and the base 51 and the glass base 54 are pasted together with an adhesive. The light scattering layer 53 is arranged on one surface 54a of the glass base 54, and they are pasted together with an adhesive. The glass base 54 functions to maintain each of the base 51 on which the daylighting portions 52 are formed and the light scattering layer 53 in a plane shape. In addition, an adhesion layer is provided on a surface of each of the daylighting portions 52, which is opposite to a surface in contact with the base 51, and an entire of the daylighting member 11 is adhered to window glass 61 via the adhesion layer. Spaces between the daylighting portions 52 are gap portions 55.

The daylighting member 11 is composed of the base 51 on which the daylighting portions 52 are formed, the light scattering layer 53, and the support plate 54 which supports each of them so as to be in a plane shape. This daylighting member 11 is used in a state of being hung from a ceiling 62 by using a metal part 56 or the like.

For the base 51, for example, a base having light transparency, which is formed of resins and the like such as a thermoplastic polymer or engineering plastic, is used. Specifically, for example, a triacetylcellulose (TAC) film, a polyethylene terephthalate (PET) film, a cycloolefin polymer (COP) film, polycarbonate (PC), or the like is used as a preferable material.

Each of the daylighting portions 52 is formed of a thermoplastic resin, for example, such as a cycloolefin polymer (COP), polycarbonate (PC), or polymethyl methacrylate (PMMA). Alternatively, each of the daylighting portions 52 is formed of an organic material having light transparency and photosensitivity, such as an acrylic resin, an epoxy resin, or a silicone resin, for example. A mixture made of a transparent resin obtained by mixing, into such a resin, a polymerization initiator, a coupling agent, a monomer, an organic solvent, etc. is able to be used for forming each of the daylighting portions 52. Further, the polymerization initiator may contain various additional components, such as a stabilizer, an inhibitor, a plasticizer, a fluorescent brightener, a release agent, a chain transfer agent, and other photopolymerizable monomers. Each of the daylighting portions 52 is formed by being transferred from a mold with a method such as a thermal imprint method or a UV imprint method. A total light transmittance of each of the daylighting portions 52 which are obtained in this manner is preferably equal to or greater than 90%. Thereby, it is possible to obtain sufficient transparency.

Each of the daylighting portions 52 is a polygonal member which linearly extends to be long and narrow in one direction (direction perpendicular to a paper surface of FIG. 11), and whose sectional shape in a direction orthogonal to a longitudinal direction is like a tip of a knife. Each of the daylighting portions 52 is arranged so that the knife faces outside a room. The longitudinal direction of the daylighting portions 52 is parallel to one side of the first base 51 having a rectangular shape. The plurality of daylighting portions 52 are arranged to be parallel to each other with no space or away from each other.

When it is set that a width of a first end surface 52a of each of the daylighting portions 52 is w1, a height of the daylighting portion 52 in a direction normal to the base 51 is h, and a pitch of the daylighting portion 52 in an array direction is p, all of the daylighting portions 52 have the same width w1 of the first end surface 52a, height h, and pitch p. Moreover, the width w1 of the first end surface 52a is 10 µm to 200 µm, for example. The height h of the daylighting portions 52 is 10 µm to 200 µm, for example.

In the present embodiment, an interval between the daylighting portions 52 is constant, but the interval of the daylighting portions 52 is not necessarily constant. The plurality of daylighting portions 52 may be arranged to be adjacent to each other with an irregular interval.

Thereby, it is possible to suppress generation of interference fringes caused in a case where the daylighting portions 52 are regularly formed. In addition, it is not always necessary to arrange the plurality of daylighting portions 52 with intervals, and the daylighting portions 52 may not be in contact with each other.

In each of the gap portions 55, there is air. Accordingly, a reflective index of the gap portions 55 is approximately 1.0. By setting the reflective index of the gap portions 55 to be 1.0, a critical angle at an interface 52c between the gap portion 55 and the daylighting portion 52 becomes the smallest. In the case of the present embodiment, the gap portion 55 is set to be an air layer composed of air, but the gap portion 55 may be an inert gas layer composed of inert gas such as nitrogen, or may be a reduced pressure layer brought into a state where pressure is reduced.

Light scatterers 57 included in the light scattering layer 53 have a function of scattering light incident on the light scattering layer 53. The light scatterers 57 are particles (small pieces) which have a reflective index different from that of a resin 58 constituting the light scattering layer 53. It is desirable that the light scatterers 57 are mixed into the light scattering layer 53 and dispersed without aggregation. A shape of each of the light scatterers 57 may be a globular shape, an ellipse globular shape, a flat plate shape, a polyhedron, or the like, for example. Sizes of the light scatterers 57 only need to be, for example, about 0.5 µm to 20 µm, and may be uniform or may be different.

The light scattering layer 53 is not necessarily limited to have a configuration in which the light scatterers 57 are dispersed, and may be configured by a layer on a surface of which unevenness is formed. In this case, the unevenness may be formed directly on the second surface 51b of the base 51.

The daylighting member 11 is arranged to be substantially parallel to a window surface so that the longitudinal direction of each of the daylighting portions 52 is in a horizontal direction and the array direction of the plurality of daylighting portions 52 is in a vertical direction. Light directly delivered from the sun is incident obliquely downward on the daylighting member 11.

For convenience of description, it is set here that a point at which one certain light flux of the light incident on the daylighting portion 52 is incident on a lower side surface 52c (a reflection surface, or an interface between the gap portion 55 and the daylighting portion 52) of the daylighting portion 52 is a point c. A virtual straight line which passes through the point c and is orthogonal to the first surface 51a of the base 51 is a straight line f. In two spaces whose boundary is a horizontal plane including the straight line f, a space on a side in which the light incident on the point c exists is a first space s1, and a space on a side in which the light incident on the point c does not exist is a second space s2.

Light l1 incident from the first end surface 52a of the daylighting portion 52 is totally reflected by, for example, the lower side surface 52c of the daylighting portion 52, travels obliquely upward, that is, toward the side of the first space s1, and is output from the daylighting portion 52.

The light l1 output from the daylighting portion 52 passes through the base 51, is scattered by the light scatterers 57 of the light scattering layer 53, and output from the daylighting member 11.

Second Embodiment

Hereinafter, a second embodiment of the invention will be described with reference to FIG. 12A and FIG. 12B.

A daylighting device of the second embodiment is used for taking sunlight into a room, for example, in a form of being pasted on a window.

Figure 12A:
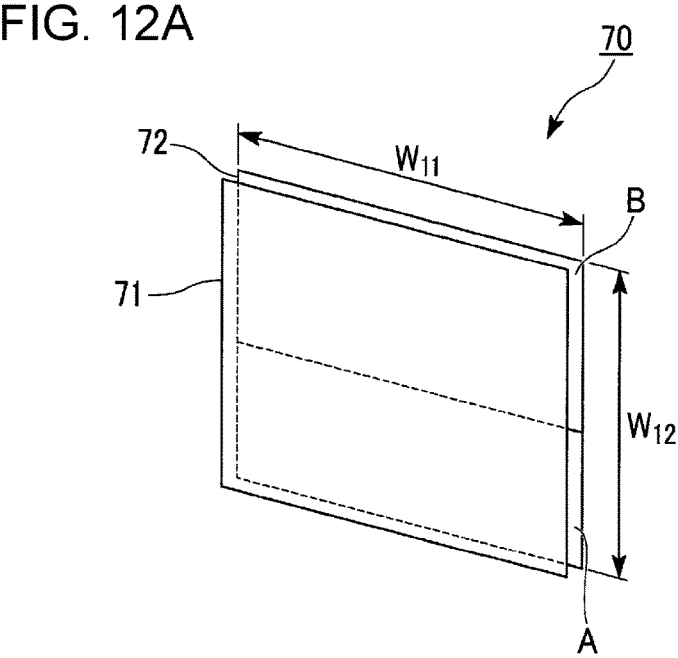
FIG. 12A is a schematic perspective view illustrating a daylighting device of a second embodiment.
Figure 12B:
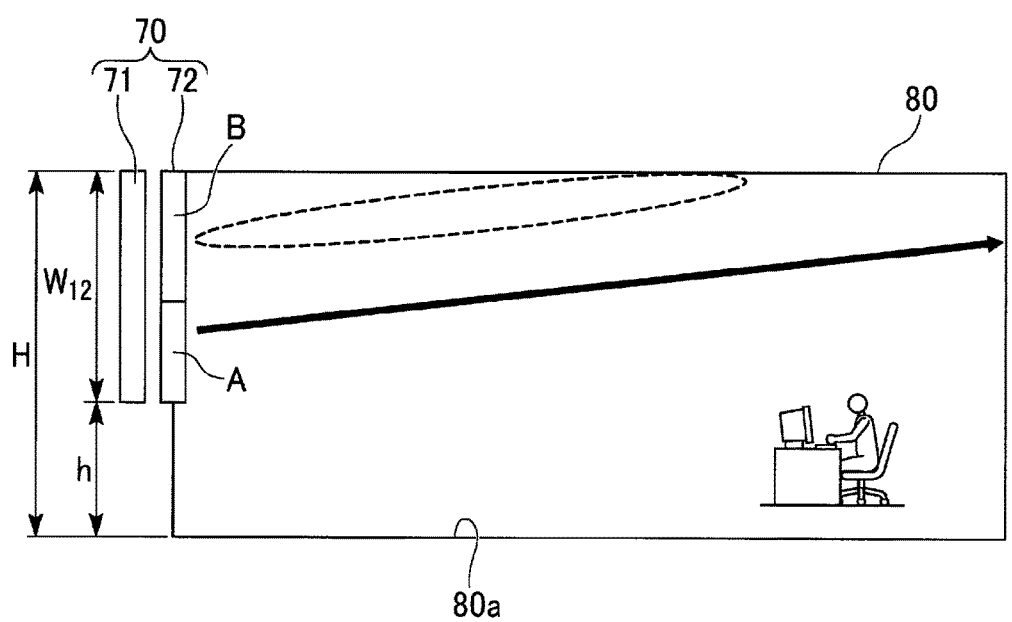
FIG. 12B is a schematic sectional view illustrating the daylighting device of the second embodiment.

FIG. 12A and FIG. 12B are schematic views illustrating the daylighting device of the present embodiment, and FIG. 12A is a perspective view and FIG. 12B is a sectional view.

A daylighting device 70 of the present embodiment is schematically composed of a daylighting member 71 and a light diffusion member 72 which is arranged on a light output surface side of the daylighting member 71 and diffuses light output from the daylighting member 71.

For the daylighting member 71 and the light diffusion member 72, ones similar to those of the above-described first embodiment are used.

Here, a ceiling height H of a room 80 is 270 cm, for example. In one surface of the room 80, four windows each of which has a horizontal width of 150 cm and a vertical width of 180 cm are installed from the ceiling. The daylighting device 70 of the present embodiment is installed on each surface of the windows. A region in which the daylighting device 70 is installed with respect to the windows is set to have 60 cm from an upper side (side in contact with the ceiling) of each of the windows. Thereby, when taking light via the window, a person in the room 80 is not dazzled.

In this case, it is set that a horizontal width $W_{11}$ and a vertical width $W_{12}$ of the daylighting device 70 are 150 cm and 60 cm, respectively. Thus, a height h from a floor surface 60a of the room 60 to the daylighting device 50 is 210 cm.

In the present embodiment, as illustrated in FIG. 12A and FIG. 12B, the light diffusion member 72 has two types of light diffusion regions A and B, which have light diffusion characteristics different from each other, along an up-and-down direction (vertical direction) of the room, and the light diffusion regions A and B are arranged to be adjacent to each other. In the light diffusion member 72, the light diffusion region B in which light scattering is strong is disposed in an upper part in the up-and-down direction of the room 80, and the light diffusion region A in which light scattering is weak is disposed in a lower part in the up-and-down direction of the room 80.

In the present embodiment, the light diffusion regions A and B which are formed to have diffusion patterns illustrated in FIG. 8A and FIG. 8B are used for the light diffusion member 72, for example.

The most part of light which is taken through the light diffusion region B arranged in the upper part of the window surface is occupied by components which illuminate a vicinity of the window of the room 80, but a light amount of components which are diffused in the up-and-down direction of the room 80 does not become excessive in the vicinity of the window, and it is possible to uniformly illuminate a large area to deep inside the room 80.

On the other hand, since light which is taken through the light diffusion region A arranged in the lower part of the window surface is used for illuminating deep inside the room 80, it is better not to be diffused much in the up-and-down direction of the room 80. In a case where the light which is taken through the light diffusion region A is diffused in the up-and-down direction of the room 80, strength of light which reaches deep inside the room 80 becomes weak.

Moreover, the light which is taken through the light diffusion region A easily enters into eyes of a person in the room 80 to be glare. In view of such circumstances, by performing control by changing diffusion states of taken light between the upper part (light diffusion region B) and the lower part (light diffusion regions A and B) of the light diffusion member 72, it is possible to realize an ideal daylighting state.

Note that, though a case where the light diffusion region A and the light diffusion region B are clearly sectioned in a horizontal direction is exemplified in the present embodiment, embodiments of the invention are not limited thereto. In the embodiments of the invention, in a middle region of the two types of light diffusion regions which are adjacent to each other, diffusion patterns of the two types of light diffusion regions may be formed so that light diffusion characteristics thereof becomes middle of those of the two types of light diffusion regions. Moreover, density of arrangement or shapes of the diffusion patterns may be changed stepwise and little by little from one light diffusion region toward the other light diffusion region.

Third Embodiment

Hereinafter, a third embodiment of the invention will be described with reference to FIG. 13.

A daylighting device of the third embodiment is used for taking sunlight into a room, for example, in a form of being pasted on a window.

Figure 13:
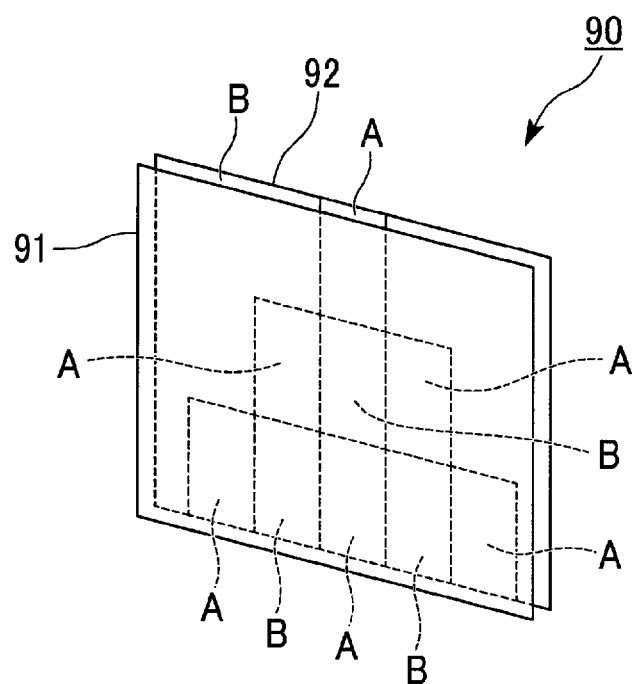
FIG. 13 is a schematic perspective view illustrating a daylighting device of a third embodiment.

FIG. 13 is a schematic perspective view illustrating the daylighting device of the present embodiment.

A daylighting device 90 of the present embodiment is schematically composed of a daylighting member 91 and a light diffusion member 92 which is arranged on a light output surface side of the daylighting member 91 and diffuses light output from the daylighting member 91.

For the daylighting member 91 and the light diffusion member 92, ones similar to those of the above-described first embodiment are used.

In the present embodiment, as illustrated in FIG. 13, the light diffusion member 92 has two types of light diffusion regions A and B which have light diffusion characteristics different from each other, and the light diffusion regions A and B are arranged to be adjacent to each other. Moreover, in the light diffusion member 92, the light diffusion regions A and B are disposed so that the light diffusion regions B in which light scattering is strong occupy a large area in an upper side of the light diffusion member 92 and the light diffusion regions A in which light scattering is weak occupy a large area in a lower side of the light diffusion member 92. That is, an area of the light diffusion regions A, which occupies one surface of the light diffusion member 92, becomes larger as being close to the lower side from the upper side of the light diffusion member 92. On the other hand, an area of the light diffusion regions B, which occupies the one surface of the light diffusion member 92, becomes smaller as being close to the lower side from the upper side of the light diffusion member 92.

In a case where the daylighting device 90 is arranged on a window surface similarly to the above-described second embodiment, the most part of light which is taken through the light diffusion regions B which are arranged more in an upper part of the window surface is occupied by components illuminating a vicinity of the window, but a light amount of components which are diffused in an up-and-down direction of the room does not become excessive in the vicinity of the window, and it is possible to uniformly illuminate a large area to deep inside the room.

On the other hand, light which is taken through the light diffusion regions A which are arranged more in a lower part of the window surface is used for illuminating deep inside the room, and therefore not diffused much in the up-and-down direction of the room.

Further, in the present embodiment, the light diffusion regions A and B are formed to each have a size in which a horizontal width is several mm to several tens cm and a vertical width is several mm to several tens cm, and arranged to be adjacent to each other, and thereby it is possible to macroscopically provide strong light scattering in the upper side of the light diffusion member 92 and weak light scattering in the lower side of the light diffusion member 72.

Fourth Embodiment

Hereinafter, a fourth embodiment of the invention will be described with reference to FIG. 14A to FIG. 14C.

A daylighting device of the fourth embodiment is used for taking sunlight into a room, for example, in a form of being pasted on a window.

Figure 14A:
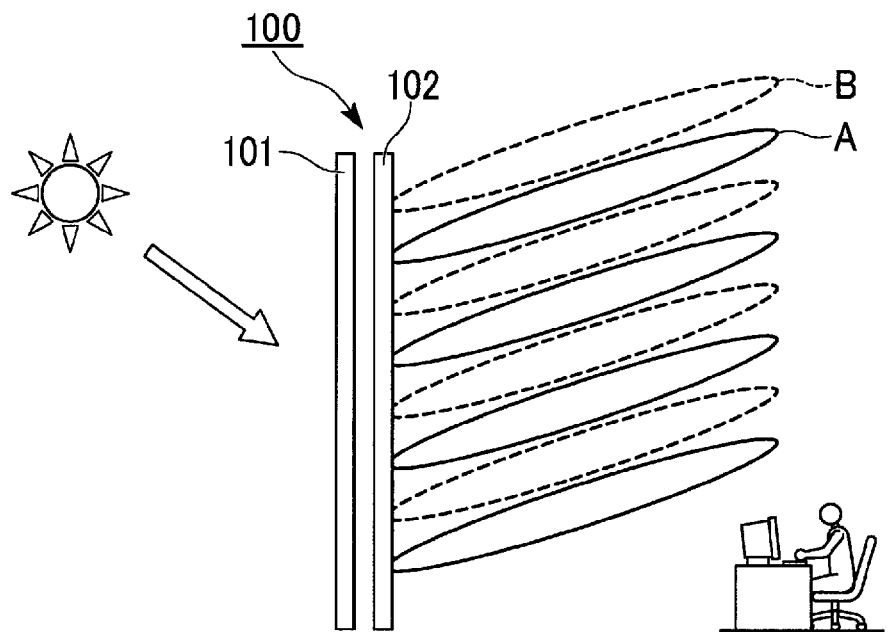
FIG. 14A is a schematic sectional view illustrating a daylighting device of a fourth embodiment.
Figure 14B:
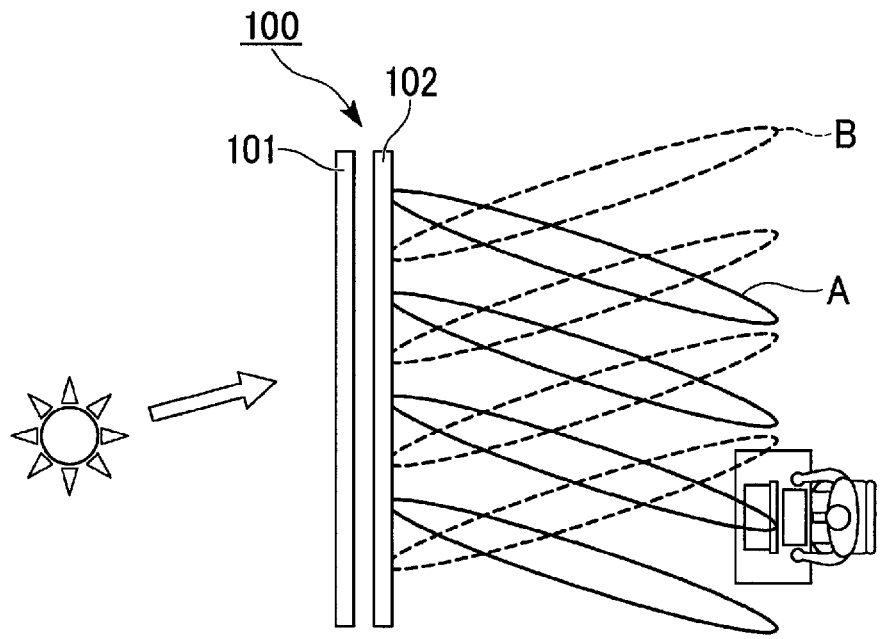
FIG. 14B is a first schematic plan view illustrating the daylighting device of the fourth embodiment.
Figure 14C:
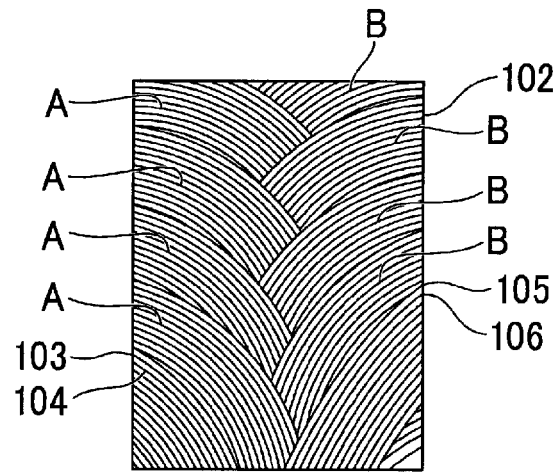
FIG. 14C is a second schematic plan view illustrating the daylighting device of the fourth embodiment.

FIG. 14A to FIG. 14C are schematic views illustrating the daylighting device of the present embodiment, and FIG. 14A is a sectional view, FIG. 14B is a plan view, and FIG. 14C is a plan view.

A daylighting device 100 of the present embodiment is schematically composed of a daylighting member 101 and a light diffusion member 102 which is arranged on a light output surface side of the daylighting member 101 and diffuses light output from the daylighting member 101.

For the daylighting member 101, one similar to that of the above-described first embodiment is used.

As illustrated in FIG. 14C, the light diffusion member 102 has two types of light diffusion regions A and B which have light diffusion characteristics different from each other, and the light diffusion regions A and B are arranged to be adjacent to each other.

Each of the light diffusion regions A has a large number of projecting line portions 103 disposed next to each other at predetermined intervals, and is composed of the projecting line portions 103 and concaves 104 therebetween. Moreover, the projecting line portions 103 and the concaves 104 are curved.

On the other hand, each of the light diffusion regions B has a large number of projecting line portions 105 disposed next to each other at predetermined intervals, and is composed of the projecting line portions 105 and concaves 106 therebetween. Moreover, the projecting line portions 105 and the concaves 106 are curved.

In addition, a width of each of the projecting line portions 105 of the light diffusion regions B is set to be wider than a width of each of the projecting line portions 103 of the light diffusion regions A. Thereby, light scattering is weak in the light diffusion regions A and light scattering is strong in the light diffusion regions B.

In a case where the daylighting device 100 is arranged on a window surface similarly to the above-described second embodiment, the most part of light which is taken through the light diffusion regions B is occupied by components illuminating a vicinity of the window, but a light amount of components which are diffused in an up-and-down direction of the room does not become excessive in the vicinity of the window, and it is possible to uniformly illuminate a large area to deep inside the room.

On the other hand, light which is taken through the light diffusion regions A is used for illuminating deep inside the room, and therefore not diffused much in the up-and-down direction of the room.

Fifth Embodiment

Hereinafter, a fifth embodiment of the invention will be described with reference to FIG. 15.

A daylighting device of the fifth embodiment is used for taking sunlight into a room, for example, in a form of being pasted on a window.

Figure 15:
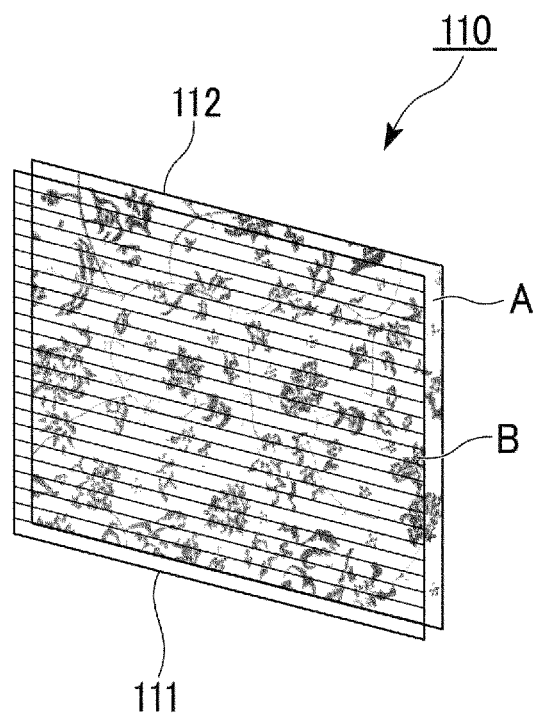
FIG. 15 is a schematic perspective view illustrating a daylight device of a fifth embodiment.

FIG. 15 is a schematic perspective view illustrating the daylight device of the present embodiment.

A daylighting device 110 of the present embodiment is schematically composed of a daylighting member 111 and a light diffusion member 112 which is arranged on a light output surface side of the daylighting member 111 and diffuses light output from the daylighting member 111.

For the daylighting member 111, one similar to that of the above-described first embodiment is used.

As illustrated in FIG. 15, the light diffusion member 112 has two types of light diffusion regions A and B which have light diffusion characteristics different from each other, and the light diffusion regions A and B are arranged to be adjacent to each other.

In the light diffusion member 112, each of the light diffusion regions A is a region in which a design such as a pattern is not drawn, and each of the light diffusion regions B is a region on which the design such as a pattern is displayed, that is, a region composed of the design itself.

Each of the light diffusion regions A is a region in which diffusion patterns such as unevenness are not formed. On the other hand, each of the light diffusion regions B is a region in which diffusion patterns such as unevenness are formed, and a region in which the diffusion patterns are formed in a size which allows visual observation. Thereby, light scattering is weak in the light diffusion regions A and light scattering is strong in the light diffusion regions B.

In the daylighting device 110, by forming the diffusion patterns, which form the light diffusion regions B, in the size which allows visual observation, a difference of strength is generated between light transmitted through the light diffusion regions B and light transmitted through the light diffusion regions A, and the difference is recognized as a pattern by a person in the room. In addition, the daylighting device 110 is installed on a boundary of an inside of the room and an outside of the room (window surface), and therefore preferably also has an aspect as an interior design or an exterior design. In this manner, by forming on the light diffusion member 112 the diffusion patterns in the size which allows visual observation, it is possible to easily apply designability with a pattern with respect to the daylighting device 110.

Further, it is preferable that the diffusion patterns are formed in a size and with arrangement of an extent that light taken by each of the diffusion patterns which form the light diffusion regions B, that is, each of the diffusion patterns which form the design illustrated in FIG. 15 is sufficiently mixed in the room. That is, it is preferable that each of the diffusion patterns is formed on one surface of the light diffusion member 112 so as to have a size of several mm to several tens cm. In a case where the size of the diffusion pattern is larger than this, the taken light is not sufficiently mixed, and an effect obtained by mixing the light diffusion regions A and B is to be lost in some cases.

Sixth Embodiment

Hereinafter, a sixth embodiment of the invention will be described with reference to FIG. 16A to FIG. 16C.

A daylighting device of the sixth embodiment is used for taking sunlight into a room, for example, in a form of being pasted on a window.

Figure 16A:
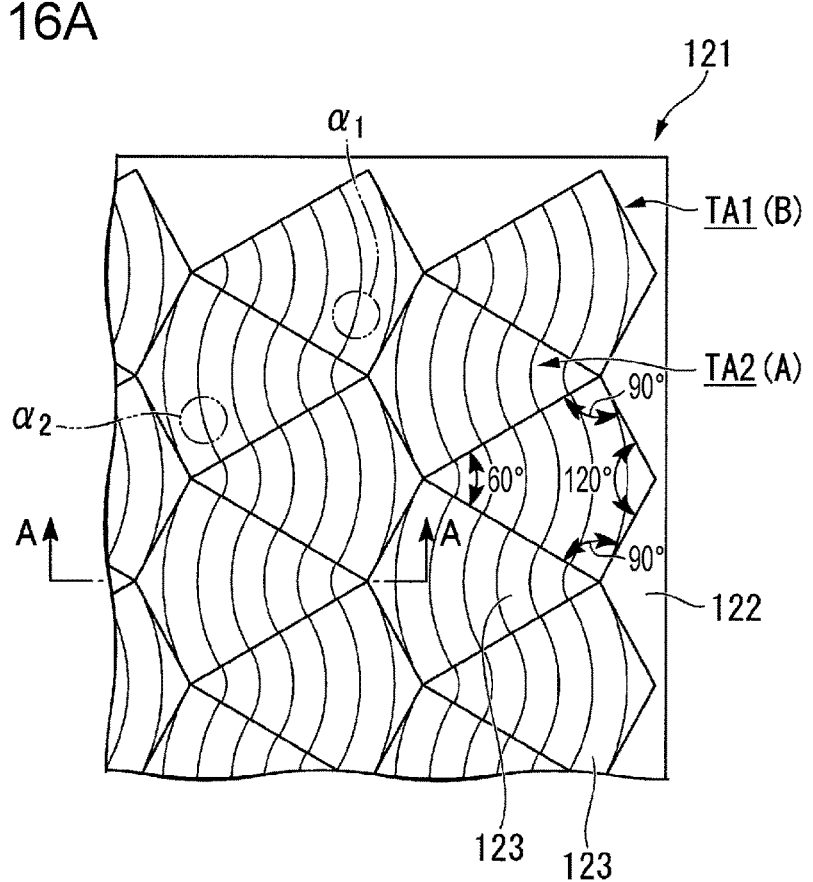
FIG. 16A is a schematic plan view illustrating a light diffusion member which constitutes a daylighting device of a sixth embodiment.
Figure 16B:
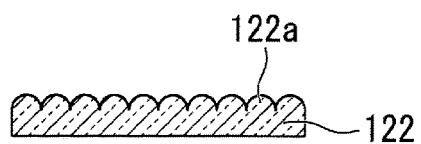
FIG. 16B is a schematic view illustrating the light diffusion member which constitutes the daylighting device of the sixth embodiment, and a sectional view taken along a line A-A in FIG. 16A.
Figure 16C:
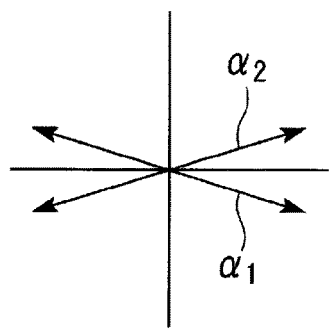
FIG. 16C is a schematic view illustrating the light diffusion member which constitutes the daylighting device of the sixth embodiment, and a view illustrating directions of light diffusion in an $\alpha_1$ part and an $\alpha_2$ part of FIG. 16A.

FIG. 16A to FIG. 16C are schematic plan views illustrating a light diffusion member which constitutes the daylighting device of the present embodiment.

The daylighting device of the present embodiment is schematically composed of a daylighting member and a light diffusion member 121 which is arranged on a light output surface side of the daylighting member and diffuses light output from the daylighting member.

For the daylighting member, one similar to that of the above-described first embodiment is used.

As illustrated in FIG. 16A and FIG. 16B, in the light diffusion member 121, a plurality of tiling regions TA1 and TA2 are provided on one surface 122a of a base 122. In each of the plurality of tiling regions TA1 and TA2, a plurality of light diffusion portions 123 which are concentrically arranged when viewed from a direction normal to the base 122 and each of which has an arc shape are formed. In two tiling regions TA1 and TA2 which are adjacent to each other, shapes of the light diffusion portions 123 in the tiling regions are the same, but directions of protrusions of the arc shapes are different from each other.

The plurality of tiling regions TA1 and TA2 include two types of tiling regions. Each of first tiling regions TA1 and second tiling regions TA2 has a shape of a quadrilateral.

More specifically, the quadrilateral has two pairs of two adjacent sides having the same length.

In the present embodiment, the quadrilateral four interior angles of which are 120°, 90°, 60°, and 90° is adopted.

In each of the first tiling regions TA1 and the second tiling regions TA2, the plurality of (six, in the present embodiment) light diffusion portions 123 which have stripes in a concentric sector shape with an apex whose interior angle is 60° as a center are formed. As illustrated in FIG. 16B, sectional shapes of the light diffusion portions 123 are sections of a structure of lenticular lenses each of which has an arc shape, and, with this sectional structure, light is diffused in a direction orthogonal to a direction in which the sector stripes are formed. On the base 122, the plurality of light diffusion portions 123 whose sectional shapes are mutually the same are concentrically arranged at predetermined intervals.

The shapes of each of the first tiling regions TA1 and each of the second tiling regions TA2 are the same, except that the shapes are vertically inverted so that the directions of the protrusions of the arc shapes become opposite to each other. On the one surface of the base 122, the first tiling regions TA1 and the second tiling regions TA2 are arrayed with no space.

In the light diffusion member 121, the light diffusion portions 123 are curved and an extending direction of each of the light diffusion portions 123 changes in one tiling region TA1 or TA2.

In the present embodiment, the first tiling regions TA1 are the light diffusion regions A and the second tiling regions TA2 are the light diffusion regions B, for example.

When arrangement is performed so that a direction having the angles of 60° and 120° among the four interior angles of each of the first tiling regions TA1 and the second tiling regions TA2 is set in a horizontal direction, light diffused by an $\alpha_1$ part or an $\alpha_2$ part of FIG. 16A in a substantially vertical direction is diffused in respective arrow directions of FIG. 16C by this light diffusion member, so that it becomes possible to uniformly illuminate a wide range of the room.

Thereby, though the most part of light which is taken through the light diffusion regions B which occupy a large area in an upper side of a window surface is occupied by components illuminating a vicinity of the window, a light amount of components which are diffused in an up-and-down direction of the room does not become excessive in the vicinity of the window, and it is possible to uniformly illuminate a large area to deep inside the room.

On the other hand, light which is taken through the light diffusion regions A which occupy a large area in a lower side of the window surface is used for illuminating deep inside the room, and therefore not diffused much in the up-and-down direction of the room.

Seventh Embodiment

Hereinafter, a seventh embodiment of the invention will be described with reference to FIG. 17.

A daylighting device of the seventh embodiment is used for taking sunlight into a room, for example, in a form of being pasted on a window.

Figure 17:
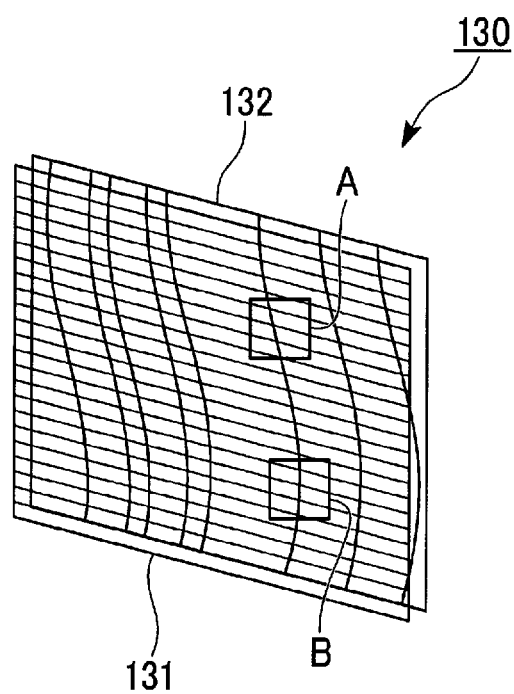
FIG. 17 is a schematic perspective view illustrating a daylighting device of a seventh embodiment.

FIG. 17 is a schematic perspective view illustrating the daylighting device of the present embodiment.

A daylighting device 130 of the present embodiment is schematically composed of a daylighting member 131 and a light diffusion member 132 which is arranged on a light output surface side of the daylighting member 131 and diffuses light output from the daylighting member 131.

For the daylighting member 131, one similar to that of the above-described first embodiment is used.

As illustrated in FIG. 17, the light diffusion member 132 is composed of wave shapes in an up-and-down direction thereof, and has a plurality of diffusion patterns which diffuse light in different directions continuously formed, so that the diffusion patterns are continuously formed without having any clear boundary. Each of the diffusion patterns has, for example, a plurality of projecting line portions disposed next to each other at predetermined intervals, and is composed of the projecting line portions and concaves therebetween. In addition, the projecting portions and the concaves are curved.

In the light diffusion member 132 having such diffusion patterns, when extracting a certain region A (light diffusion region A) and a certain region B (light diffusion region B) and observing diffusion structures thereof, it is possible to consider that the diffusion pattern in the light diffusion region A is formed toward the lower right of the light diffusion member 132 and the diffusion pattern in the light diffusion region B is formed toward the lower left of the light diffusion member 132.

That is, it is possible to consider that the plurality of different light diffusion regions are continuously formed in the light diffusion member 132 without having any clear boundary.

In a case where the daylighting device 130 is arranged on a window surface similarly to the above-described second embodiment, for example, light taken through the light diffusion region B illuminates a vicinity of the window, and light taken through the light diffusion region A illuminates deep inside the room.

[Lighting Control System]

Figure 18:
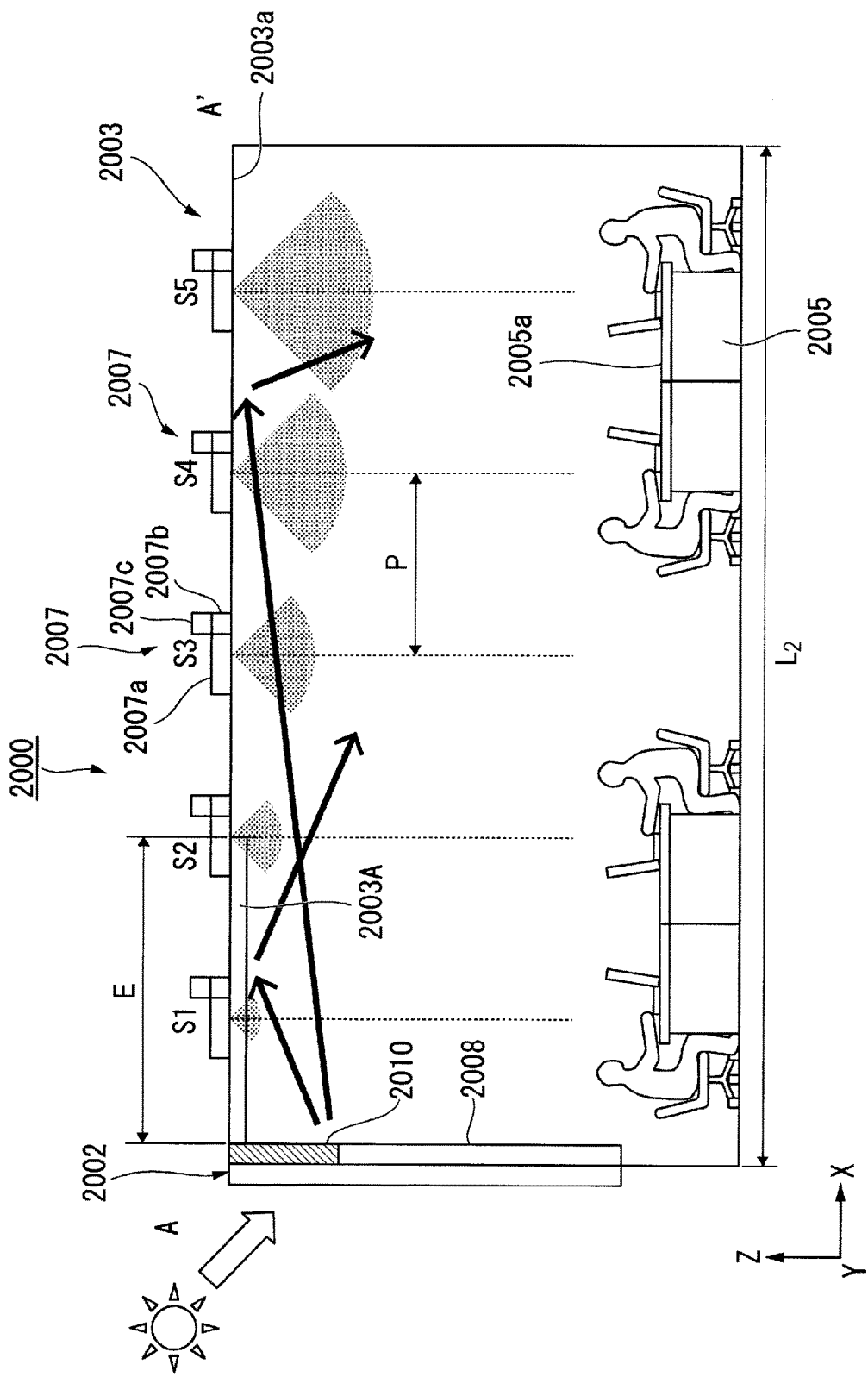
FIG. 18 is a view illustrating a room model 2000 having a daylighting device and a lighting control system.

FIG. 18 is a view illustrating a room model 2000 having a daylighting device and a lighting control system.

Figure 19:
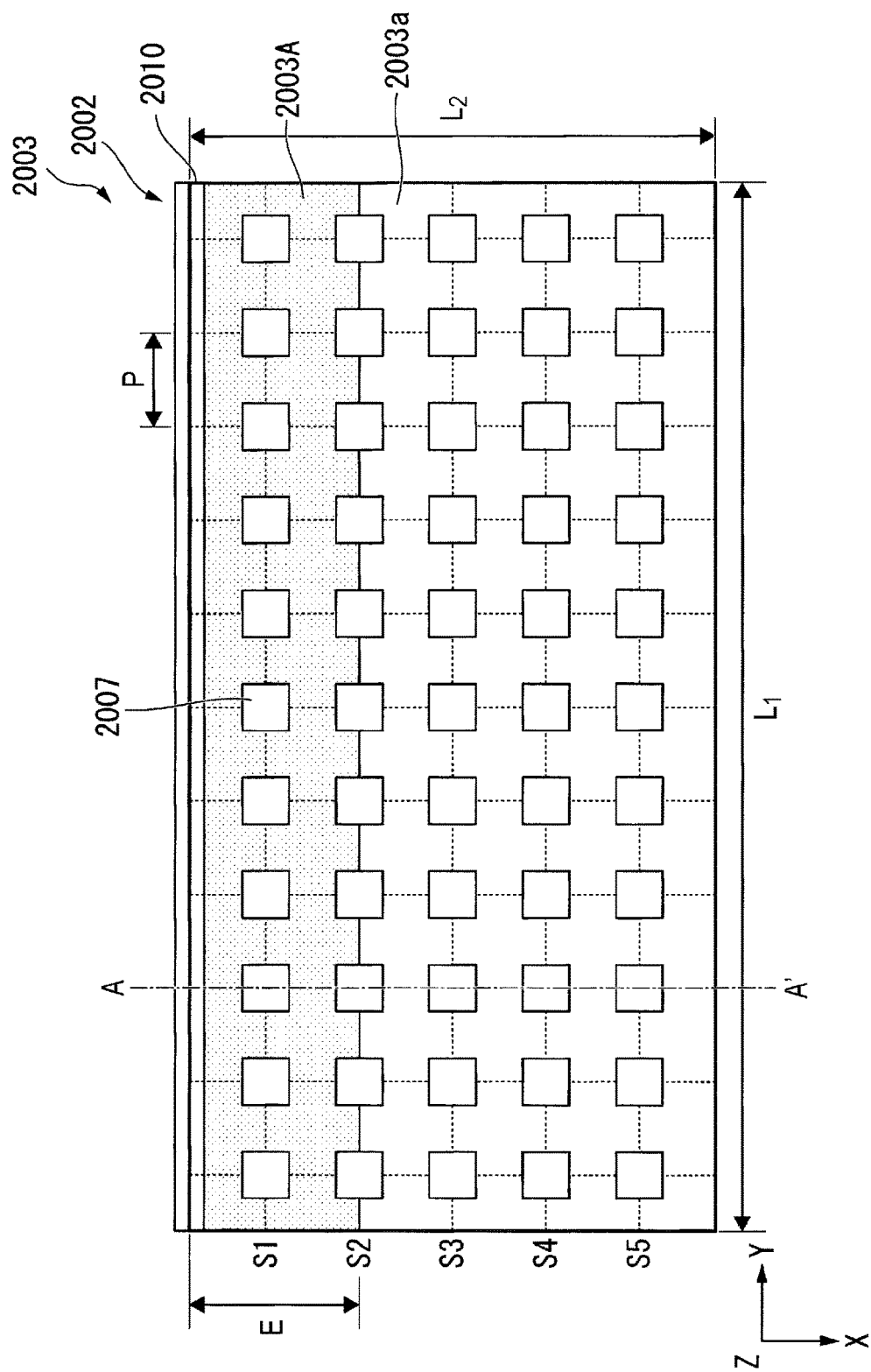
FIG. 19 is a plan view illustrating a ceiling of the room model 2000.

FIG. 19 is a plan view illustrating a ceiling of the room model 2000.

In the invention, a ceiling material forming a ceiling 2003a of a room 2003 to which external light is guided may have high light reflectivity. As illustrated in FIG. 18 and FIG. 19, a light reflective ceiling material 2003A is provided as the ceiling material having light reflectivity on the ceiling 2003a of the room 2003. In order to promote guiding of external light from a daylighting device 2010 provided on a window 2002 to deep inside the room, the light reflective ceiling material 2003A is provided on the ceiling 2003a close to the window. Specifically, the light reflective ceiling material 2003A is provided in a predetermined region E of the ceiling 2003a (a region of about 3 m from the window 2002).

As described above, the light reflective ceiling material 2003A functions as a guide to guide the external light, which is guided into the room through the window 2002 on which the daylighting device 2010 of the invention (the daylighting device of any of the aforementioned embodiments) is installed, to deep inside the room efficiently. The external light guided from the daylighting device 2010 toward the ceiling 2003a in the room is reflected by the light reflective ceiling material 2003A and a direction of the light is changed to illuminate a desk top surface 2005a of a desk 2005 which is placed in the deep inside of the room, thus exerting an effect of making the desk top surface 2005a bright.

The light reflective ceiling material 2003A may have diffusion reflectivity or may have specular reflectivity, but preferably has both properties mixed appropriately in order to achieve both the effect of making the desk top surface 2005a of the desk 2005 placed in the deep inside of the room bright and the effect of suppressing glare light uncomfortable for a person in the room.

Though most of the light guided into the room by the daylighting device 2010 of the invention travels to the ceiling near the window 2002, an amount of light is usually sufficient near the window 2002. Thus, the light reflective ceiling material 2003A as described above is used in combination, and thereby it is possible to allocate the light incident on the ceiling (region E) near the window to the deep inside of the room where an amount of light is less than that near the window side.

The light reflective ceiling material 2003A is able to be created, for example, by embossing a metal plate made of aluminum or the like with unevenness of about several tens of microns or by applying vapor deposition of a metal thin film made of aluminum or the like to a surface of a resin base on which similar unevenness is formed. Alternatively, unevenness may be formed by embossing a curved surface with longer intervals.

Further, by appropriately changing an embossing shape to be formed on the light reflective ceiling material 2003A, it is possible to control light distribution characteristics of light and distribution of light in the room. For example, when the embossment is performed in a stripe shape extending to deep inside the room, the light reflected by the light reflective ceiling material 2003A expands in a right-and-left direction of the window 2002 (a direction intersecting a longitudinal direction of unevenness). When a size and a direction of the window 2002 of the room 2003 are limited, by using such a property, it is possible to diffuse the light in a horizontal direction and reflect light toward deep inside the room by the light reflective ceiling material 2003A.

The daylighting device 2010 of the invention is used as a part of a lighting control system of the room 2003. The lighting control system is composed of components of the entire room, for example, including the daylighting device 2010, a plurality of indoor lighting devices 2007, a solar radiation adjustment device 2008 installed on the window, a control system 2009 for those components, and the light reflective ceiling material 2003A provided on the ceiling 2003a.

The window 2002 of the room 2003 has the daylighting device 2010 provided on an upper side thereof and has the solar radiation adjustment device 2008 provided on a lower side thereof. Here, a blind is installed as the solar radiation adjustment device 2008, but there is no limitation thereto.

In the room 2003, the plurality of indoor lighting devices 2007 are arranged in a lattice manner in the right-and-left direction (Y direction) of the window 2002 and in a depth direction (X direction) of the room. The plurality of indoor lighting devices 2007 constitute the entire lighting system of the room 2003 along with the daylighting device 2010.

As illustrated in FIG. 18 and FIG. 19, for example, the ceiling 2003a of an office in which a length L1 of the window 2002 in the right-and-left direction (Y direction) is 18 m and a length L2 of the room 2003 in the depth direction (X direction) is 9 m is illustrated. Here, the indoor lighting devices 2007 are arranged in a lattice manner at an interval P of 1.8 m in a horizontal direction (Y direction) and a depth direction (X direction) of the ceiling 2003a. More specifically, fifty indoor lighting devices 2007 are arrayed with 10 rows (Y direction)×5 columns (X direction).

Each of the indoor lighting devices 2007 includes indoor lighting equipment 2007a, a brightness detection unit 2007b, and a control unit 2007c, and is formed with the brightness detection unit 2007b and the control unit 2007c integrated with the indoor lighting equipment 2007a.

The indoor lighting devices 2007 may include a plurality of pieces of indoor lighting equipment 2007a and a plurality of brightness detection units 2007b. However, one brightness detection unit 2007b is provided for each piece of indoor lighting equipment 2007a. The brightness detection unit 2007b receives light reflected by a surface illuminated by the indoor lighting equipment 2007a and detects illuminance of the illuminated surface. Here, the illuminance of the desk top surface 2005a of the desk 2005 placed in the room is detected by the brightness detection unit 200b.

The control units 2007c each of which is provided in each of the indoor lighting devices 2007 are connected to each other. Each of the indoor lighting devices 2007 performs feedback control, by the control units 2007c connected to each other, to adjust light outputs of LED lamps of each indoor lighting equipment 2007a so that the illuminance of the desk top surface 2005a that is detected by each brightness detection unit 2007b is a certain target illuminance L0 (for example, average illuminance: 750 lx).

FIG. 20 is a graph indicating a relation between illuminance of light (natural light) taken into the room by the daylighting device and illuminance by the indoor lighting devices (lighting control system).

As illustrated in FIG. 20, the illuminance of the desk top surface by the daylighting device 2010 (daylighting of natural light) is reduced as being away from the window. On the other hand, when the indoor lighting devices 2007 (lighting control system) are installed on the ceiling in the room without installing the daylighting device 2010 on the window, the illuminance of the desk top surface increases as being away from the window. When the daylighting device 2010 and the indoor lighting devices 2007 (lighting control system) are used in combination, it is found that the illuminance of the desk top surface in the room increases as a whole compared to a case where one of the daylighting device 2010 and the indoor lighting devices 2007 (lighting control system) is used. With an effect of the daylighting device 2010, it is the brightest on the window side and brightness is slightly reduced as being away from the window, but substantially fixed illuminance (average illuminance: 750 lx) is obtained.

As described above, by using the daylighting device 2010 and the lighting control system (indoor lighting devices 2007) in combination, light is able to reach deep inside the room and brightness in the room is able to be further increased. Thus, a bright light environment which is much more stable is obtained without being affected by an altitude of the sun.

INDUSTRIAL APPLICABILITY

One aspect of the invention is able to be applied to a daylighting device capable of effectively taking light into a space such as a room.

REFERENCE SIGNS LIST 10 daylighting device
11 daylighting member
12 light diffusion member

The invention claimed is:

1. A daylighting device comprising:
a daylighting member including:
a base having light transparency,
a plurality of daylighting portions that are provided on one surface of the base and have light transparency, and
gap portions provided between the plurality of daylighting portions; and
a light diffusion member that is on a light output surface side of the daylighting member and diffuses light output from the daylighting member, wherein
at least two types of light diffusion regions are provided on one surface side of the light diffusion member, and the at least two types of light diffusion regions have light diffusion characteristics different from each other, and
the at least two types of light diffusion regions have different light diffusion strengths.

2. The daylighting device according to claim 1, wherein the at least two types of light diffusion regions are adjacent to each other.

3. The daylighting device according to claim 2, wherein the at least two types of light diffusion regions are adjacent to each other in a vertical direction.

4. The daylighting device according to claim 2, wherein the at least two types of light diffusion regions are defined by a plurality of first light diffusion regions having a first light scattering and a plurality of second light diffusion regions having a second light scattering, the second light scattering being stronger than the first light scattering, and
the plurality of first light diffusion regions and the plurality of second light diffusion regions are arranged in a lattice.

5. The daylighting device according to claim 1, wherein a proportion occupied by at least one type of the light diffusion regions changes along one direction of the one surface of the light diffusion member.

6. The daylighting device according to claim 5, wherein the proportion occupied by the at least one type of the light diffusion regions changes in a vertical direction.

7. The daylighting device according to claim 1, wherein the light diffusion regions have designability.

* * * * *